US010448239B2

(12) United States Patent
Faccin et al.

(10) Patent No.: US 10,448,239 B2
(45) Date of Patent: Oct. 15, 2019

(54) MECHANISM TO ENABLE OPTIMIZED USER PLANE ANCHORING FOR MINIMIZATION OF USER PLANE RELOCATION DUE TO USER EQUIPMENT MOBILITY

(71) Applicant: QUALCOMM Incorporated, San Diego, CA (US)

(72) Inventors: Stefano Faccin, San Ysidro, CA (US); Haris Zisimopoulos, London (GB); Hong Cheng, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/879,098

(22) Filed: Jan. 24, 2018

(65) Prior Publication Data

US 2018/0227743 A1    Aug. 9, 2018

Related U.S. Application Data

(60) Provisional application No. 62/455,418, filed on Feb. 6, 2017.

(51) Int. Cl.
*H04W 8/08*       (2009.01)
*H04W 76/10*    (2018.01)
(Continued)

(52) U.S. Cl.
CPC ........... *H04W 8/08* (2013.01); *H04L 65/1069* (2013.01); *H04W 24/02* (2013.01); *H04W 48/17* (2013.01); *H04W 76/10* (2018.02)

(58) Field of Classification Search
CPC ....... H04W 8/08; H04W 76/10; H04W 24/02; H04W 48/17; H04L 65/1069
See application file for complete search history.

(56) References Cited

U.S. PATENT DOCUMENTS

2018/0097894 A1*  4/2018  Li ........................... H04L 47/14
2018/0192390 A1*  7/2018  Li ........................... H04W 76/12

OTHER PUBLICATIONS

"3rd Generation Partnership Project; Technical Specification Group Services and System Aspects; Procedures for the 5G System; Stage 2; (Release 15)", 3GPP Standard; 3GPP TS 23.502, 3rd Generation Partnership Project (3GPP), Mobile Competence Centre 650, Route Des Lucioles; F-06921 Sophia-Antipolis Cedex; France, vol. SA WG2, No. V0.1.1, Jan. 26, 2017 (Jan. 26, 2017), XP051230651, pp. 1-46.

(Continued)

*Primary Examiner* — Marisol Figueroa
(74) *Attorney, Agent, or Firm* — Holland & Hart LLP

(57) ABSTRACT

Methods, systems, and devices for wireless communication are described. Relocation of a user plane may be minimized through the exchange of communication session information between network nodes. For example, a connectivity session manager and an access and mobility manager may exchange information associated with a user equipment (UE) communication session to prevent unnecessary reestablishment of an existing communication session. In such cases, the access and mobility manager may receive a session management request from a UE and send a request including the session management request to the connectivity session manager. Based on the received message, the connectivity session manager may identify a continuity mode, select a user plane anchor for the communication session, and send a response message to the access and mobility manager. In some examples, the connectivity session manager and the access and mobility manager may exchange session area codes associated with the location of the UE.

18 Claims, 18 Drawing Sheets

(51) Int. Cl.
*H04W 48/00* (2009.01)
*H04W 24/02* (2009.01)
*H04L 29/06* (2006.01)

(56) References Cited

OTHER PUBLICATIONS

"3rd Generation Partnership Project; Technical Specification Group Services and System Aspects; Study on control and user plane separation of EPC nodes (Release 14)", 3GPP Standard; 3GPP TR 23.714, 3rd Generation Partnership Project (3GPP), Mobile Competence Centre 650, Route Des Lucioles; F-06921 Sophia-Antipolis Cedex; France, vol. SA WG2, No. V14.0.0, Jun. 22, 2016 (Jun. 22, 2016), XP051123546, pp. 1-87.
International Search Report and Written Opinion—PCT/US2018/015192—ISA/EPO—dated Mar. 21, 2018.
"3rd Generation Partnership Project; Technical Specification Group Services and System Aspects; System Architecture for the 5G System; Stage 2 (Release 15)", 3GPP Standard; 3GPP TS 23.501, 3rd Generation Partnership Project (3GPP), Mobile Competence Centre 650, Route Des Lucioles; F-06921 Sophia-Antipolis Cedex France, vol. SA WG2, No. V0.1.1, Jan. 26, 2017 (Jan. 26, 2017), XP051230649, pp. 1-67.

* cited by examiner

MECHANISM TO ENABLE OPTIMIZED USER PLANE ANCHORING FOR MINIMIZATION OF USER PLANE RELOCATION DUE TO USER EQUIPMENT MOBILITY

CROSS REFERENCES

The present Application for Patent claims priority to U.S. Provisional Patent Application No. 62/455,418 by Faccin, et al., entitled "A Mechanism to Enable Optimized User Plane Anchoring for Minimization of User Plane Relocation Due to User Equipment Mobility," filed Feb. 6, 2017, assigned to the assignee hereof, and is hereby expressly incorporated by reference herein in its entirety.

INTRODUCTION

The following relates generally to wireless communication, and more specifically to minimization of user plane relocation due to user equipment (UE) mobility.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as UEs.

In some wireless communications systems, communication session and mobility management for a UE may be associated with various network nodes within the system. For example, communication sessions for a UE may be managed by a number of different network nodes, where respective nodes may handle different aspects of the communication sessions between the UE and a data network (or multiple data networks). However, when the UE moves through different areas served by the network, the different network nodes may not maintain updated or accurate information associated with the UE and its mobility, particularly in cases where the UE is in an idle mode while moving. Such scenarios may result in a reestablishment of communication sessions with the data network and thus introduce latency into the UE's communications.

SUMMARY

The described techniques relate to improved methods, systems, devices, or apparatuses that support a mechanism to enable optimized user plane anchoring for minimization of user plane relocation due to UE mobility.

A method of wireless communication is described. The method may include receiving a request message comprising a session management request for establishing a communication session for a UE and first information about the communication session, identifying a continuity mode based at least in part on the received session management request, selecting a user plane anchor to serve the communication session for the UE according to the identified continuity mode, and transmitting a response message based at least in part on the selected user plane anchor, the response message comprising a session management response and response communication session information that includes at least an indication of the identified continuity mode.

An apparatus for wireless communication is described. The apparatus may include means for receiving a request message comprising a session management request for establishing a communication session for a UE and first information about the communication session, means for identifying a continuity mode based at least in part on the received session management request, means for selecting a user plane anchor to serve the communication session for the UE according to the identified continuity mode, and means for transmitting a response message based at least in part on the selected user plane anchor, the response message comprising a session management response and response communication session information that includes at least an indication of the identified continuity mode.

Another apparatus for wireless communication is described. The apparatus may include a processor, memory in electronic communication with the processor, and instructions stored in the memory. The instructions may be operable to cause the processor to receive a request message comprising a session management request for establishing a communication session for a UE and first information about the communication session, identify a continuity mode based at least in part on the received session management request, select a user plane anchor to serve the communication session for the UE according to the identified continuity mode, and transmit a response message based at least in part on the selected user plane anchor, the response message comprising a session management response and response communication session information that includes at least an indication of the identified continuity mode.

A non-transitory computer readable medium for wireless communication is described. The non-transitory computer-readable medium may include instructions operable to cause a processor to receive a request message comprising a session management request for establishing a communication session for a UE and first information about the communication session, identify a continuity mode based at least in part on the received session management request, select a user plane anchor to serve the communication session for the UE according to the identified continuity mode, and transmit a response message based at least in part on the selected user plane anchor, the response message comprising a session management response and response communication session information that includes at least an indication of the identified continuity mode.

Some examples of the method, apparatus, and non-transitory computer-readable medium described above may further include processes, features, means, or instructions for identifying a second continuity mode for the communication session. Some examples of the method, apparatus, and non-transitory computer-readable medium described above may further include processes, features, means, or instructions for selecting a second user plane anchor to serve the communication session according to the identified second continuity mode. Some examples of the method, apparatus, and non-transitory computer-readable medium described above may further include processes, features, means, or instructions for transmitting a message based at least in part on the selected second user plan anchor.

Some examples of the method, apparatus, and non-transitory computer-readable medium described above may further include processes, features, means, or instructions for determining a session area code value based at least in part on the selected user plane anchor and the identified continuity mode. In some examples of the method, apparatus, and non-transitory computer-readable medium described above, determining the session area code value comprises: determining, using a connectivity session manager session area code table, the session area code value corresponding to the selected user plane anchor and the identified continuity mode.

In some examples of the method, apparatus, and non-transitory computer-readable medium described above, the response communication session information comprises an indication of the determined session area code. In some examples of the method, apparatus, and non-transitory computer-readable medium described above, the response communication session information includes an indication of whether the identified continuity mode should be considered for determining a registration area.

In some examples of the method, apparatus, and non-transitory computer-readable medium described above, selecting the user plane anchor comprises: determining the user plane anchor based at least in part on a local policy, a UE subscription, the first information about the communication session, or a combination thereof. In some examples of the method, apparatus, and non-transitory computer-readable medium described above, the first information about the communication session comprises UE location information that includes a registration area, a cell identity (ID), a proposed session area code value, or a combination thereof.

In some examples of the method, apparatus, and non-transitory computer-readable medium described above, selecting the user plane anchor comprises: determining, using a session area code table, the user plane anchor from a set of user plane anchors that correspond to the proposed session area code value and the identified continuity mode. In some examples of the method, apparatus, and non-transitory computer-readable medium described above, selecting the user plane anchor comprises: discarding the proposed session area code value based at least in part on a local policy, a UE subscription, or both. Some examples of the method, apparatus, and non-transitory computer-readable medium described above may further include processes, features, means, or instructions for selecting the user plane anchor based on the local policy, the UE subscription, or both and according to the identified continuity mode.

In some examples of the method, apparatus, and non-transitory computer-readable medium described above, the session management request comprises a proposed session priority requested by the UE and associated with the communication session. Some examples of the method, apparatus, and non-transitory computer-readable medium described above may further include processes, features, means, or instructions for transmitting, as part of the response communication session information, a selected session priority based at least in part on the proposed session priority. Some examples of the method, apparatus, and non-transitory computer-readable medium described above may further include processes, features, means, or instructions for receiving a subscribed session priority from unified data management.

Some examples of the method, apparatus, and non-transitory computer-readable medium described above may further include processes, features, means, or instructions for comparing the proposed session priority with the subscribed session priority. Some examples of the method, apparatus, and non-transitory computer-readable medium described above may further include processes, features, means, or instructions for determining the selected session priority based at least in part on the comparison. In some examples of the method, apparatus, and non-transitory computer-readable medium described above, the continuity mode comprises a session and service continuity (SSC).

In some examples of the method, apparatus, and non-transitory computer-readable medium described above, the communication session comprises a protocol data unit (PDU) session. In some examples of the method, apparatus, and non-transitory computer-readable medium described above, the request message may be received from an access and mobility manager. In some examples of the method, apparatus, and non-transitory computer-readable medium described above, the response message may be transmitted to an access and mobility manager.

A method of wireless communication is described. The method may include receiving a session management request to establish a communication session for a UE, transmitting a request message comprising the session management request and first information about the communication session, receiving a response message comprising a session management response and response communication session information that includes at least a continuity mode, and determining a registration area for the UE based at least in part on the response communication session information.

An apparatus for wireless communication is described. The apparatus may include means for receiving a session management request to establish a communication session for a UE, means for transmitting a request message comprising the session management request and first information about the communication session, means for receiving a response message comprising a session management response and response communication session information that includes at least a continuity mode, and means for determining a registration area for the UE based at least in part on the response communication session information.

Another apparatus for wireless communication is described. The apparatus may include a processor, memory in electronic communication with the processor, and instructions stored in the memory. The instructions may be operable to cause the processor to receive a session management request to establish a communication session for a UE, transmit a request message comprising the session management request and first information about the communication session, receive a response message comprising a session management response and response communication session information that includes at least a continuity mode, and determine a registration area for the UE based at least in part on the response communication session information.

A non-transitory computer readable medium for wireless communication is described. The non-transitory computer-readable medium may include instructions operable to cause a processor to receive a session management request to establish a communication session for a UE, transmit a request message comprising the session management request and first information about the communication session, receive a response message comprising a session management response and response communication session information that includes at least a continuity mode, and determine a registration area for the UE based at least in part on the response communication session information.

Some examples of the method, apparatus, and non-transitory computer-readable medium described above may further include processes, features, means, or instructions for receiving a message for a second user plan anchor to serve the communication session for the UE. Some examples of the method, apparatus, and non-transitory computer-readable medium described above may further include processes, features, means, or instructions for determining a first session area code value associated with a location of the UE. Some examples of the method, apparatus, and non-transitory computer-readable medium described above may further include processes, features, means, or instructions for including the session area code value in the first information about the communication session. In some examples of the method, apparatus, and non-transitory computer-readable medium described above, determining the registration area comprises: determining, using an access and mobility manager session area code table, the registration area corresponding to the first session area code value.

In some examples of the method, apparatus, and non-transitory computer-readable medium described above, the response communication session information comprises an indication of a second session area code value, and wherein determining the registration area comprises: determining, using an access and mobility manager session area code table, the registration area corresponding to the second session area code value. In some examples of the method, apparatus, and non-transitory computer-readable medium described above, the response communication session information comprises an indication of whether the continuity mode should be considered for determining the registration area.

In some examples of the method, apparatus, and non-transitory computer-readable medium described above, the response communication session information comprises a session priority associated with the communication session. Some examples of the method, apparatus, and non-transitory computer-readable medium described above may further include processes, features, means, or instructions for storing the session priority. In some examples of the method, apparatus, and non-transitory computer-readable medium described above, determining the registration area comprises: determining the registration area based at least in part on the session priority.

Some examples of the method, apparatus, and non-transitory computer-readable medium described above may further include processes, features, means, or instructions for determining that a current registration area for the UE may be insufficient based at least in part on the determined registration area and the continuity mode. Some examples of the method, apparatus, and non-transitory computer-readable medium described above may further include processes, features, means, or instructions for transmitting an updated registration may be to the UE based at least in part on the determination that the current registration area of the UE may be insufficient. In some examples of the method, apparatus, and non-transitory computer-readable medium described above, the session management request may be received from the UE. In some examples of the method, apparatus, and non-transitory computer-readable medium described above, the request message may be transmitted to a connectivity session manager.

DETAILED DESCRIPTION

Figure 1:
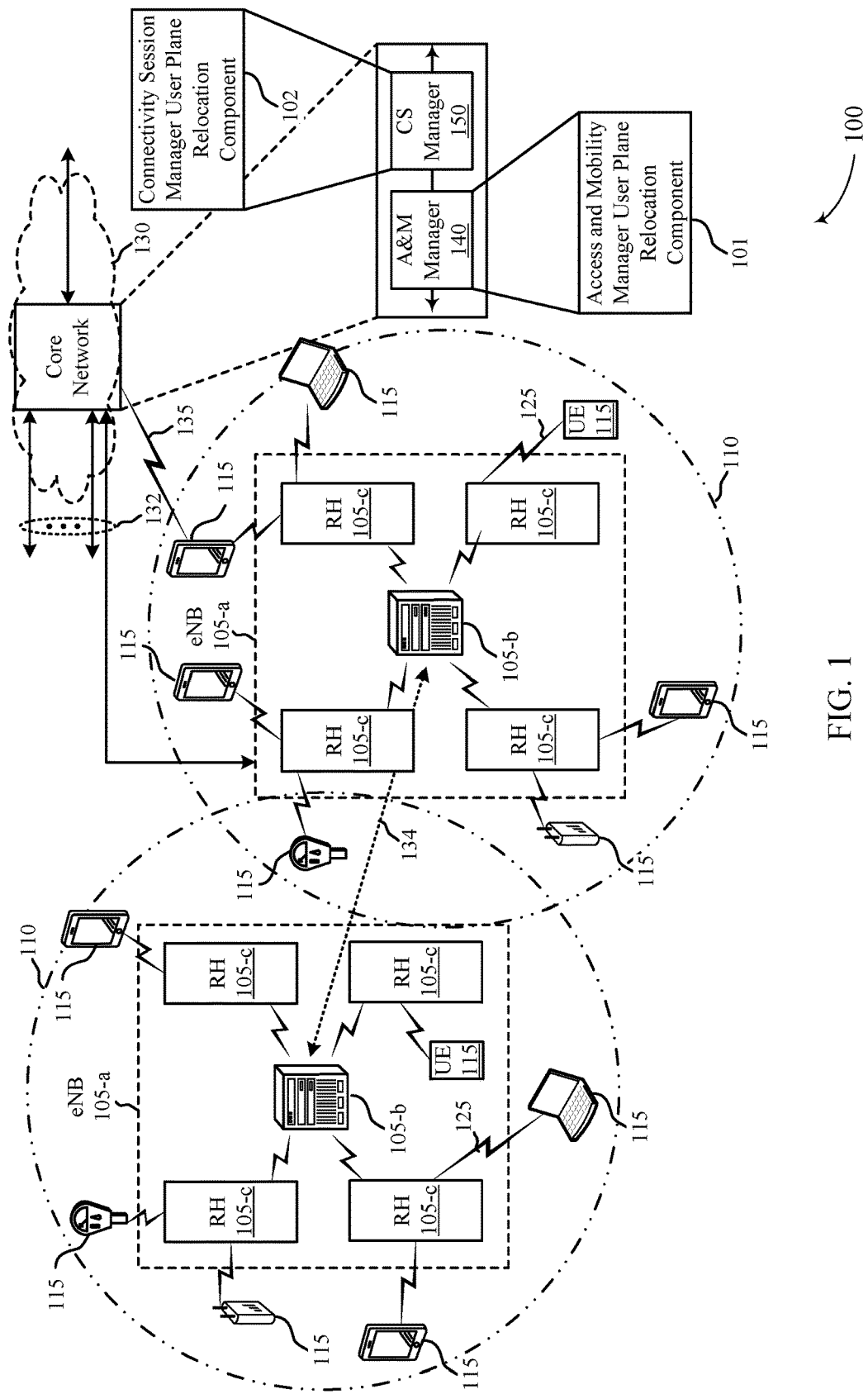
FIG. 1 illustrates an example of a system for wireless communication that supports a mechanism to enable optimized user plane anchoring for minimization of user plane relocation due to UE mobility in accordance with one or more aspects of the present disclosure.

In some wireless systems, a UE may access a data network (DN) to exchange data packets using a PDU session. The UE and the DN may exchange PDUs via a user plane anchor, which may utilize a user plane function (UPF). In many cases, the terms user plane anchor and UPF may be used interchangeably. The UPF may have an associated area, which may be referred to as a "serving area," where the UPF may provide connectivity services for the UE to the DN. Different UPFs may cover different "serving areas" within the DN.

The DN or another function may provide the UE with a registration area for the DN. A registration area may be a set of locations (e.g., tracking areas (TAs), cell identifiers (or cell IDs), etc.) within which the UE may move in an idle state without informing the network of a different UE location (e.g., by performing a re-registration procedure). During a PDU session, the UE may enter an idle state and move about within the designated registration area. Depending on a session and service continuity (SSC) mode of the PDU session, as the UE moves, the UE may remain connected to the DN through the same user plane anchor and corresponding UPF or may be served by a different user plane anchor and UPF (e.g., a UPF relocation is triggered, depending on the type of SSC mode). For example, while within the registration area, the UE may move out of a "serving area" associated with a UPF serving the UE PDU session. The UE may leave its idle mode and perform a service request to the DN, such as when the UE has data to transmit. The network (e.g., a session management function (SMF)) may allocate a new UPF (i.e., perform user plane relocation) for the service and, in some cases, may trigger the UE to establish a new PDU session anchored in a new UPF. However, the allocation of the new UPF may introduce latency for the UE when sending uplink data upon performing the service request.

To minimize the frequency of user plane relocation, the UE may initiate a PDU session establishment procedure that utilizes UE location information to select an appropriate UPF. During the PDU session establishment procedure, one or more functions may select a registration area and a UPF based on the UE location information, SSC mode, local policies, subscription information of the UE, or any combination of these parameters. In this way, the one or more functions may select a UPF with a "serving area" that covers a specific registration area corresponding to the location of the UE. The one or more functions may designate the specific registration area to the UE. If the UE moves within the specific registration area, the UE may not undergo user plane relocation when the UE needs to transmit or receive data, and may avoid unnecessary latency (e.g., that may have otherwise been caused by the allocation of a different UPF). Alternatively, during the PDU session establishment procedure, one or more functions may select a UPF to serve the UE PDU session and determine a registration area based on location information of the UPF, the UE location information, SSC mode, local policies, subscription information of the UE, or any combination of these parameters. In this way, the one or more functions may select a registration area that covers a specific UPF "serving area."

Aspects of the disclosure are initially described in the context of a wireless communications system. Aspects of the disclosure are further illustrated by and described with reference to apparatus diagrams, system diagrams, and flowcharts that relate to minimization of user plane relocation due to user equipment mobility.

FIG. 1 illustrates an example of a wireless communications system 100 that supports a mechanism to enable optimized user plane anchoring for minimization of user plane relocation due to UE mobility in accordance with one or more aspects of the present disclosure. The wireless communications system 100 includes base stations 105 (e.g., gNodeBs (gNBs), and/or radio heads (RHs))), UEs 115, and a core network 130. In some examples, the wireless communications system 100 may be a LTE (or LTE-Advanced) network, or a NR network. In some cases, wireless communications system 100 may support enhanced broadband communications, ultra-reliable (i.e., mission critical) communications, low latency communications, and communications with low-cost and low-complexity devices. Wireless communications system 100 may support the efficient communication of location information between network nodes to reduce the establishment of new PDU sessions for a UE 115 that is already in communication with the network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 135 through communication link 135. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, S2, etc.). Base stations 105 may communicate with one another over backhaul links 134 (e.g., X1, X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one packet data network gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. For instance, the core network 130 may include a number of management functions or managers that are in communication with each other. In some cases, the core network 130 may include various network nodes, such as an access and mobility manager 140, which may support aspects of an access and mobility management function (AMF), and a connectivity session manager 150, which may support aspects of an SMF. The access and mobility manager 140 and connectivity session manager 150 may be in communication with each other, and with other managers or functions, within the core network 130.

At least some of the network nodes within the core network 130, such as access and mobility manager 140 and/or connectivity session manager 150, may include subcomponents that perform one or more functions in accordance with one or more aspects of the present disclosure. For example, the access and mobility manager 140 may include an access and mobility manager user plane relocation component 101, which may receive a session management request to establish a communication session for a UE 115, transmit a request message including the session management request and first information about the communication session, receive a response message including a session management response and response communication session information that includes at least a continuity mode, and determine a registration area for the UE 115 based on the response communication session information.

Connectivity session manager 150 may include a connectivity session manager user plan relocation component 102, which may receive a request message including a session management request for establishing a communication session for a UE 115 and first information about the communication session, identify a continuity mode based on the received session management request, select a user plane anchor to serve the communication session for the UE 115 according to the identified continuity mode, and transmit a response message based on the selected user plane anchor, the response message including a session management response and response communication session information that includes at least an indication of the identified continuity mode.

Wireless communications system 100 may support a minimization of a user plane relocation through the exchange of communication session information between network nodes. For example, connectivity session manager 150 and an access and mobility manager 140 may exchange information associated with a UE communication session to prevent unnecessary reestablishment of an existing communication session. In such cases, the access and mobility manager 140 may receive a session management request from a UE 115 and send a request message including the session management request to the connectivity session manager 150. Based on the received message, the connectivity session manager 150 may identify a continuity mode, select a user plane anchor for the communication session, and send a response message to the access and mobility manager 140. In some examples, the connectivity session manager 150 and the access and mobility manager 140 may exchange session area codes associated with the location of the UE 115.

Figure 2:
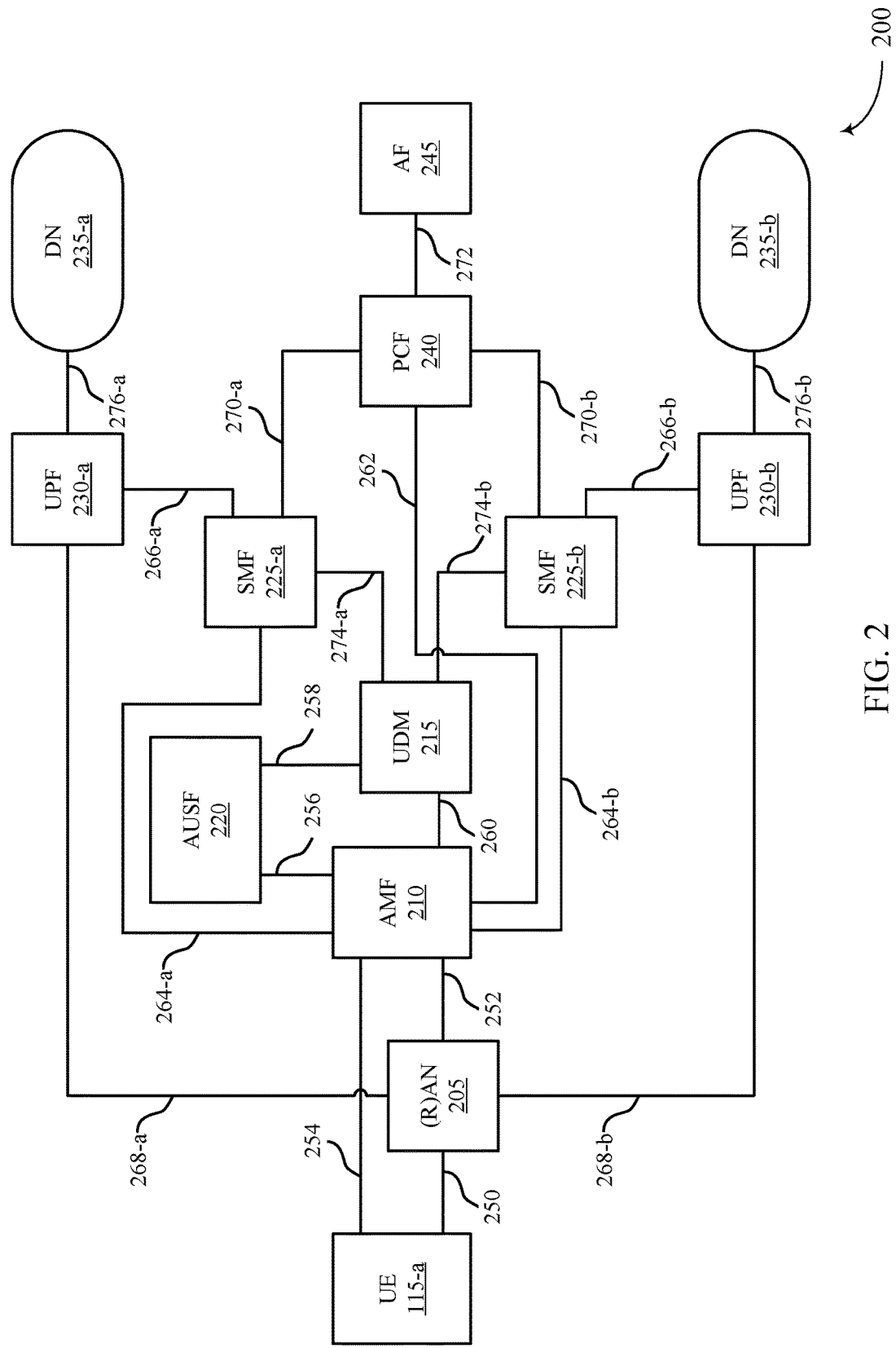
FIG. 2 illustrates an example of a wireless communications system architecture that supports a mechanism to enable optimized user plane anchoring for minimization of user plane relocation due to UE mobility in accordance with one or more aspects of the present disclosure.

FIG. 2 illustrates an example of a wireless communications system architecture 200 that supports a mechanism to enable optimized user plane anchoring for minimization of user plane relocation due to UE mobility in accordance with one or more aspects of the present disclosure. Wireless communications system architecture 200 may include UE 115-a, which may be an example of a UE 115, as described with reference to FIG. 1. UE 115-a may access one or more DNs 235 (e.g., DN 235-a and DN 235-b). Wireless communications system architecture 200 may also include one or more devices, such as a connectivity session manager or an access and mobility manger, that may operate within the one or more DNs 235. The devices may include one or more (radio) access nodes ((R)ANs) 205, AMFs 210, unified data managers (UDMs) 215, authentication server functions (AUSFs) 220, SMFs 225 (e.g., SMF 225-a and SMF 225-b), UPFs 230 (e.g., UPF 230-a and UPF 230-b), policy control functions (PCFs) 240, and application functions (AFs) 245. In some embodiments, wireless communications system architecture 200 may include other functions or devices not shown, or may not include one or more of the functions or devices shown. Wireless communications system architecture 200 may support minimization of user plane relocation for PDU sessions between UE 115-a and a DN 235.

In some wireless systems (e.g., a 5G or NR wireless system), a UE 115 (e.g., UE 115-a) may access a DN 235 to exchange data packets using a communication session, such as a PDU session. The PDU session may provide a PDU connectivity service, which may support the transmission of PDUs between UE 115-a and the DN 235. An association between UE 115-a and the DN 235 in a PDU session may use a protocol, such as IP or Ethernet, or the association may be unstructured. In some cases, UE 115-a may access multiple DNs 235 (e.g., DNs 235-a and 235-b, which may be examples of local DNs, central DNs, public land mobile networks (PLMNs), etc.) concurrently in multiple PDU sessions. In some cases, UE 115-a may use multiple SMFs 225 (e.g., SMFs 225-a and 225-b) or multiple UPFs 230 (e.g., UPFs 230-a and 230-b) for the multiple PDU sessions. UE 115-a or a DN 235 may minimize user plane relocation during UE 115-a mobility within a PDU session by utilizing a location of UE 115-a during the assignment of registration areas. The following management procedures may support implementation of user plane optimization within wireless communications system architecture 200.

UE 115-a and a DN 235 may perform registration management to setup or release a signaling relation between UE 115-a and the DN 235. UE 115-a may register with the DN 235 to receive a specific set of services (e.g., services that require registration), enable mobility tracking, or enable reachability within the DN 235. UE 115-a may initiate an initial registration procedure to register to the DN 235 on an AMF 210. In some cases, a registration timer may be associated with registration on the DN 235. UE 115-a may initiate a periodic registration procedure, where UE 115-a may undergo the periodic registration procedure with each expiration of the registration timer or following a predetermined time period of UE inactivity. UE 115-a may accordingly maintain reachability within the DN 235 based on the periodic registration procedure. In some cases, UE 115-a may move into a new tracking area (TA) within the DN 235. In these cases, UE 115-a may initiate a mobility registration procedure based on UE 115-a moving into the new TA. The DN 235 may track the location of UE 115-a and maintain reachability by registering UE 115-a in the new TA.

UE 115-a may initiate a registration procedure with one or more DNs 235 (e.g., DNs 235-a and 235-b). UE 115-a may transmit a registration request to an access node over communication link 250, which in some cases may be an example of a (R)AN 205. The registration request may include an indication of the type of registration (e.g., an initial registration, a mobility registration, or a periodic registration). Additionally, the registration request may include a subscriber permanent identifier (SUPI), a temporary user identifier (i.e., an identifier of the AMF 210 previously serving UE 115-a), security parameters, network slice selection assistance information (NSSAI), a PDU session status, or any other identifiers related to UE 115-a requesting registration in the DN 235. Based on the registration request, the (R)AN 205 may select an AMF 210 for UE 115-a.

An AMF 210 may provide registration management, connection management, reachability management, mobility management, or access authentication and authorization management for UE 115-*a* in the DN 235. In some cases, the (R)AN 205 may select the AMF 210 based on the SUPI or the temporary user identifier. In other cases (e.g., if neither of these identifiers is specified or if neither indicates a valid AMF 210), the (R)AN 205 may select the AMF 210 based on the NSSAI or other policies or protocols. The (R)AN 205 may send the registration request to the selected AMF 210 over communication link 252. In some cases, the (R)AN 205 may send additional parameters (e.g., location information, cell identity, radio access technology (RAT) type, etc.) to the selected AMF 210 along with the registration request. The selected AMF 210 may perform various procedures (e.g., as described in further detail below) based on policies, protocols, or received information.

Following the various procedures, the selected AMF 210 may transmit a registration accept message to UE 115-*a* over communication link 254 via a transmitting device or via the (R)AN 205 indicating that the registration has been accepted. The registration accept message may include a temporary user identifier, a registration area (i.e., a TA identifier list), applicable mobility restrictions, a PDU session status, NSSAI, a periodic registration update timer, or any other identifiers related to UE 115-*a* registering in the DN 235. In some cases (e.g., if the selected AMF 210 assigns UE 115-*a* a new temporary user identifier), UE 115-*a* may transmit a registration complete message over communication link 254 to the selected AMF 210 to acknowledge the registration.

In some cases, the (R)AN 205 may select a different AMF 210 than the AMF 210 previously serving UE 115-*a*. In these cases, the selected AMF 210 may send an information request, which may include the registration request, to the previous AMF 210 (not shown). The previous AMF 210 may send an information response to the selected AMF 210. The information response may include a SUPI for UE 115-*a*, a mobility management context, active PDU session information (e.g., SMF 225 identities and PDU session identities), or a combination of this information. In some cases, the selected AMF 210 may send an information acknowledged message to the previous AMF 210 in response. In some cases, the selected AMF 210 may not receive the SUPI (e.g., from either the previous AMF 210 or the (R)AN 205). The selected AMF 210 may transmit an identity request to UE 115-*a*, and UE 115-*a* may transmit an identity response back to the selected AMF 210, including the SUPI for UE 115-*a*.

In some cases, the selected AMF 210 may select an authentication server function (AUSF) 220 (e.g., based on the SUPI) for authentication and security functionality. The AUSF 220 may initiate authentication of UE 115-*a* and non-access stratum (NAS) security functions based on a request from the selected AMF 210 over communication link 256. In some cases, the AUSF 220 may be based on information stored in a unified data manager (UDM) 215. The AUSF 220 may retrieve information from the UDM 215 over communication link 258. If the AUSF 220 fails, the selected AMF 210 may reject the registration request. In some cases, the selected AMF 210 may send a request to UE 115-*a* for a permanent equipment identity (PEI) for UE 115-*a*, and UE 115-*a* may respond with the PEI. The AMF 210 may perform a PEI check (e.g., using an equipment identity register (EIR)).

In some cases, the selected AMF 210 may select a UDM 215 (e.g., based on the SUPI for UE 115-*a*). The selected AMF 210 may initiate an update location procedure over communication link 260 (e.g., if the AMF 210 has changed since the previous registration procedure, if the selected AMF 210 has no valid subscription context for UE 115-*a*, or if UE 115-*a* provides an invalid SUPI to the selected AMF 210). In some cases, the UDM 215 may initiate a cancel location procedure to the previous AMF 210. The previous AMF 210 may remove a mobility management context and send notifications to one or more SMFs 225 associated with the previous AMF 210. The selected UDM 215 may send AMF 210 related subscription data to the selected AMF 210, and the selected AMF 210 may create a mobility management context.

In some cases, the selected AMF 210 may select a policy control function (PCF) 240 (e.g., based on the SUPI for UE 115-*a*). The selected AMF 210 may send a UE context establishment request to the PCF 240 over communication link 262. The PCF 240 may apply operator policies for UE 115-*a* in the DN 235 based on the UE context establishment request, and may send a UE context establishment acknowledgment to the selected AMF 210 in response. In some cases, the PCF 240 may have established a UE context based on a request from a previous AMF 210. The previous AMF 210 may send a UE context termination request to the PCF 240. The PCF 240 may remove the UE context for the previous AMF 210, and may send a UE context termination acknowledgment to the previous AMF 210 in response.

In some cases, the selected AMF 210 may send notifications to one or more SMFs 225 serving UE 115-*a* on communication links 264. The selected AMF 210 may verify a PDU session status for UE 115-*a* with any available SMF information (e.g., SMF information received from a previous AMF 210). The selected AMF 210 may send a request to one or more SMFs 225 (e.g., to SMFs 225-*a* over communication link 264-*a* and to SMF 225-*b* over communication link 264-*b*) to release network resources related to any PDU sessions that are not active in UE 115-*a*. In some cases, an SMF 225 of the one or more SMFs 225 may initiate user plane relocation (e.g., based on information received from the selected AMF 210 or UE 115-*a*). The one or more SMFs 225 may send response messages to the selected AMF 210 over communication links 264 based on the received network resource release request.

In addition to the above registration procedure, UE 115-*a* may perform connection management (CM) to establish or release a signaling connection between UE 115-*a* and an AMF 210. UE 115-*a* may be registered in a DN 235 on the AMF 210 (e.g., through the registration procedure described above). In some cases, UE 115-*a* and the AMF 210 may not establish a NAS signaling connection. This state may be referred to as a CM-IDLE state. In the CM-IDLE state, UE 115-*a* may perform cell selection or reselection, or public land mobile network (PLMN) selection. To send or receive data, UE 115-*a* in the CM-IDLE state may perform a service request procedure. UE 115-*a* may establish a NAS signaling connection with the AMF 210, transitioning from the CM-IDLE state to a CM-CONNECTED state. UE 115-*a* may establish the NAS signaling connection by transmitting a registration request, a de-registration request, or a service request to the AMF 210 (e.g., via a (R)AN 205). In some cases, UE 115-*a* in a CM-CONNECTED state may receive system information including a tracking area identifier (TAI). UE 115-*a* may be registered within one or more TAs of the DN 235, and may maintain a list of TAIs associated with the one or more TAs. If UE 115-*a* receives a TAI within the system information that is not included in the list of registered TAIs for UE 115-*a*, UE 115-*a* may perform a registration procedure to register with the new TA associated with the received TAI.

A UE 115, such as UE 115-*a*, in a CM-IDLE state may request a secure signaling connection with an AMF 210 using a service request procedure. UE 115-*a* may transmit a service request message to send uplink signaling messages or user data, or in response to a DN paging request from a DN 235. After UE 115-*a* establishes the secure signaling connection with the AMF 210, UE 115-*a* or the DN 235 may transmit signaling messages. For example, UE 115-*a* may transmit a PDU session establishment request to the AMF 210. In some cases, an SMF 225 (e.g., via the AMF 210) may initiate a user plane resource establishment based on the PDU session establishment request by the DN 235 or on a service request message. In some cases, the AMF 210 may respond to a service request message from UE 115-*a* with a service response message. The service response message may synchronize a PDU session status between UE 115-*a* and a DN 235. In other cases, the AMF 210 may respond to the service request message with a service reject message if the DN 235 does not accept the service request message from UE 115-*a*. In some cases, if UE 115-*a* transmits the service request message based on having user data to send, and the user plane resource establishment is unsuccessful, the DN 235 may take further actions to receive the user data from UE 115-*a*.

Some wireless systems may support a PDU connectivity service. The PDU connectivity service may provide for transmission of PDUs between a UE 115 and a DN 235, where the UE 115 is registered in the DN 235 on an AMF 210. For example, UE 115-*a* may request a PDU session through the AMF 210 to enable the PDU connectivity service. UE 115-*a* may establish a PDU session, modify the PDU session, and release the PDU session by transmitting NAS session management (SM) signals to an SMF 225 (e.g., via an AMF 210). The SMF 225 may manage a PDU session, select and control a user plane anchor, such as a UPF 230 for the PDU session (e.g., using communication links 266), maintain a connection 268 (i.e., a tunnel) between the UPF 230 and a (R)AN 205 node, and provide roaming functionality to UE 115-*a*. In some cases, an SMF 225 may retrieve policy and charging control (PCC) rules from a PCF 240 over communication links 270. The PCC rules may be based on information the PCF 240 retrieved from an AF 245 over communication link 272. In some cases, the SMF 225 may determine whether a request by UE 115-*a* is compliant with a user subscription. The SMF 225 may retrieve SMF level subscription data from a UDM 215 over communication links 274, which in some cases may include a user data repository (UDR). The UDM 215 may store subscription information and long-term security credentials used for authentication. The SMF level subscription data may indicate one or more authorized PDU types, one or more authorized SSC modes, a quality of service (QoS) profile, or a combination of these identifiers for each data network name (DNN). The SMF 225 may retrieve the SMF level subscription data for the DNN associated with the DN 235 that UE 115-*a* is registered and connected in. During a PDU session, UE 115-*a* and the DN 235 may transmit and receive PDUs using the UPF 230 selected by the SMF 225 (e.g., using connection links 276).

In some cases, UE 115-*a* may establish multiple PDU sessions. The multiple PDU sessions may be between UE 115-*a* and one or more DNs 235. In some cases, UE 115-*a* may establish multiple PDU sessions with a same DN 235, where the multiple PDU sessions may be served by different UPFs 230. Different SMFs 225 may also serve UE 115-*a* for the multiple PDU sessions. In some cases, a UE 115 with multiple PDU sessions (e.g., with one or more DNNs) may use different (R)ANs 205 or UPFs 230 to interface with the one or more DNs 235. For example, UE 115-*a* may establish a first PDU session with DN 235-*a* using SMF 225-*a* and UPF 230-*a*. While using the first PDU session, UE 115-*a* may establish a second PDU session with DN 235-*b* using SMF 225-*b* and UPF 230-*b*.

A PDU session may support an SSC mode for the lifetime of the PDU session. The supported SSC mode may allow UE 115-*a* to operate under various continuity requirements for different applications and services. For example, in SSC Mode 1, the PDU session may maintain the same UPF 230 for the entire PDU session, regardless of how UE 115-*a* accesses the DN 235 (e.g., with different RATs or different cells). SSC Mode 1 may support IP continuity (i.e., an IP address of the PDU session stays the same for the entire PDU session). As another example, in SSC Mode 2, the DN 235 may trigger a release of a PDU session (e.g., and the associated UPF 230), and may transmit instructions to UE 115-*a* to establish a new PDU session. UE 115-*a* may establish the new PDU session, and an SMF 225 may select a new UPF 230 for the new PDU session. In SSC Mode 3, UE 115-*a* may establish a different connection or registration (e.g., using a new UPF 230) with a DN 235 while UE 115-*a* has an established PDU session with the same DN 235. The DN 235 may trigger UE 115-*a* to switch to the new UPF 230 over the established different connection or registration. In some cases, UE 115-*a* may release the PDU session and establish a new PDU session using the new UPF 230. In other cases, UE 115-*a* may switch to the new UPF 230 while maintaining the same PDU session. The DN 235 may allocate an IP address for the different connection or registration with the new UPF 230 before releasing the IP address for the previous UPF 230.

UE 115-*a* may identify a continuity mode, such as an SSC mode, for an application requesting data transmission. In some cases, the application may specify an SSC mode for the PDU session. In other cases, UE 115-*a* may determine an SSC mode for the application based on an SSC mode selection policy. For example, UE 115-*a* may select the SSC mode based on a non-default policy rule associated with the application, or based on a default SSC mode selection policy rule. If UE 115-*a* has an active PDU session that matches the identified SSC mode, UE 115-*a* may route the data for the application within the active PDU session. If UE 115-*a* does not have an active PDU session that matches the identified SSC mode, or if UE 115-*a* contains policies or conditions that do not permit UE 115-*a* to route the data for the application within an active PDU session, UE 115-*a* may establish a new PDU session with an SSC mode that matches the identified SSC mode associated with the application. In some cases, UE 115-*a* may not identify an SSC mode for the application, and may request a PDU session without providing an SSC mode. In these cases, the DN 235 may determine the SSC mode for the PDU session.

An SMF 225 may select an SSC mode for a PDU session. The SMF 225 may receive a list of supported SSC modes and a default SSC mode for each DNN from a UDM 215 (e.g., within subscription information). In some cases, the SMF 225 may receive an SSC mode from UE 115-*a* in a PDU session establishment request. The SMF 225 may select the SSC mode for the PDU session based on the received SSC mode, or the SMF 225 may modify the received SSC mode based on subscription information or local configurations. In other cases, UE 115-*a* may not provide an SSC mode in the PDU session establishment request. In these cases, the SMF 225 may select an SSC mode for the PDU session based on a default SSC mode for the DN 235, or based on local configurations and policies.

Within wireless communications system architecture 200, an SMF 225 may select UPFs 230 to serve a PDU session for UE 115-*a* based on various information and policies. To provide a user plane for certain PDU sessions, a UPF 230 may be located close to (R)AN 205. In some cases (e.g., such as when low latency is desired for resuming communications for UE 115-*a* in an idle state (e.g., a CM-IDLE state)), it may be beneficial to avoid allocating a different (or new) UPF 230 to UE 115-*a* such that UE 115-*a* may be served in a different location (e.g. in case of session continuity modes 2 and 3), such as when UE 115-*a* is mobile while in the idle mode.

By way of example, UE 115-*a* may have a PDU session with access to a local DN 235 via a UPF 230 located relatively close to a UE point of attachment. In such cases, a correlation between a registration area (which may also be referred to as a tracking area list (TA list)) provided to the UE 115 and the UPF location may be considered. Accordingly, a number of scenarios may be foreseen, including, for example, uniform or non-uniform "UPF serving areas" (e.g., where a "UPF serving area" may correspond to a certain area in which a UPF 230 may provide services to the UE 115-*a*). In a uniform UPF serving area scenario, AMF 210 may assign a registration area (or a TA list) to UE 115-*a*, where the registration area covers a set of cells where UE 115-*a* may be served for the PDU session by a same UPF 230. Alternatively, in the non-uniform UPF serving area case, AMF 210 may assign a registration area to UE 115-*a* that includes locations where different UPFs 230 (e.g., UPF 230-*a* and UPF 230-*b*) may serve UE 115-*a* for the PDU session. In this case, upon performing a service request, a new UPF 230 may need to be allocated to UE 115-*a*.

When UE 115-*a* enters an idle state in a uniform UPF serving area, UE 115-*a* may move within the registration area without a relocation of the UPF 230 when UE 115-*a* performs a service request. In this case, the entire registration area may be considered part of the UPF "serving area" for a respective DN 235. However, in the non-uniform UPF serving area case, when UE 115-*a* enters a connected mode by performing a service request (e.g., following UE mobility in an idle mode), after having moved within the registration area, the network may trigger a relocation of the UPF 230 serving the PDU session for UE 115-*a*. In such cases, the registration area may span the "serving areas" of different UPFs 230 for the DN 235. As a result, a delay introduced by the relocation of the UPF 230 upon performing the service request may not be acceptable, such as for some services corresponding to specific PDU sessions, and may lead to inefficient communications and a degraded user experience.

In some examples, UE 115-*a* may also have multiple PDU sessions to different DNs 235. The multiple PDU sessions may be served by different UPFs 230 with different UPF "serving areas," and the PDU sessions may have different requirements regarding the relocation of the UPF 230. For instance, UE 115-*a* may have PDU sessions through a first and second UPF 230 (e.g., UPF 230-*a* and UPF 230-*b*), but a serving area of UPF 230-*a* may be different than a serving area of the UPF 230-*b*, and the respective "serving areas" may be different sizes. In any event, a mechanism to prevent UE 115-*a* from having to establish a new or different PDU sessions may be desirable, and may result in efficient communication for UE 115-*a*.

An AMF 210 and an SMF 225 may minimize user plane relocation in a PDU session by sending UE 115 and UPF 230 location information to each other. In some cases, the AMF 210 may include a UE location indication in a session management (SM) message to the SMF 225. The UE location indication may be an example of a TAI, a cell identifier, a session area code value such as a PDU session area code (PSAC) value, or any other identifier associated with a position of the UE 115 (e.g., UE 115-*a*). The SMF 225 may select one or more UPFs 230 to serve UE 115-*a* in a PDU session. In some cases, the SMF 225 may select the one or more UPFs 230 based on the UE location indication received from the AMF 210. The SMF 225 may then send PDU session information to the AMF 210. The PDU session information may include a UPF 230 location indication and an assigned SSC mode for the PDU session. The AMF 210 may assign a registration area (i.e., a TA list) to UE 115-*a* based on the PDU session information. For example, the AMF 210 may determine a registration area based on the location of a UPF 230 (e.g., to minimize the probability of UPF relocation for UE 115-*a*). In another example, the AMF 210 may determine the registration area based on the SSC mode (e.g., if Mode 1 is assigned to the PDU session, the AMF 210 may not base the registration on mobility-based UPF relocation).

A system utilizing mobile edge computing may be an example of a system utilizing wireless communications system architecture 200. For example, a (R)AN 205 may be an example of a mobile edge computing server. In a mobile edge computing system, data processing may be performed in close proximity to a UE 115, such as UE 115-*a*, for a faster response time. In this case, the mobile edge computing system may prioritize data processing speed over IP continuity. Therefore, the mobile edge computing system may utilize SSC modes 2 and 3 and perform UPF relocation so that the data processing may occur closer to UE 115-*a*. However, because the mobile edge computing system prioritizes data processing speed, the system may try to reduce latency. To reduce latency in SSC modes 2 and 3, the mobile edge computing system may implement UE location indications during PDU session establishment to optimize UPF relocation.

Figure 3:
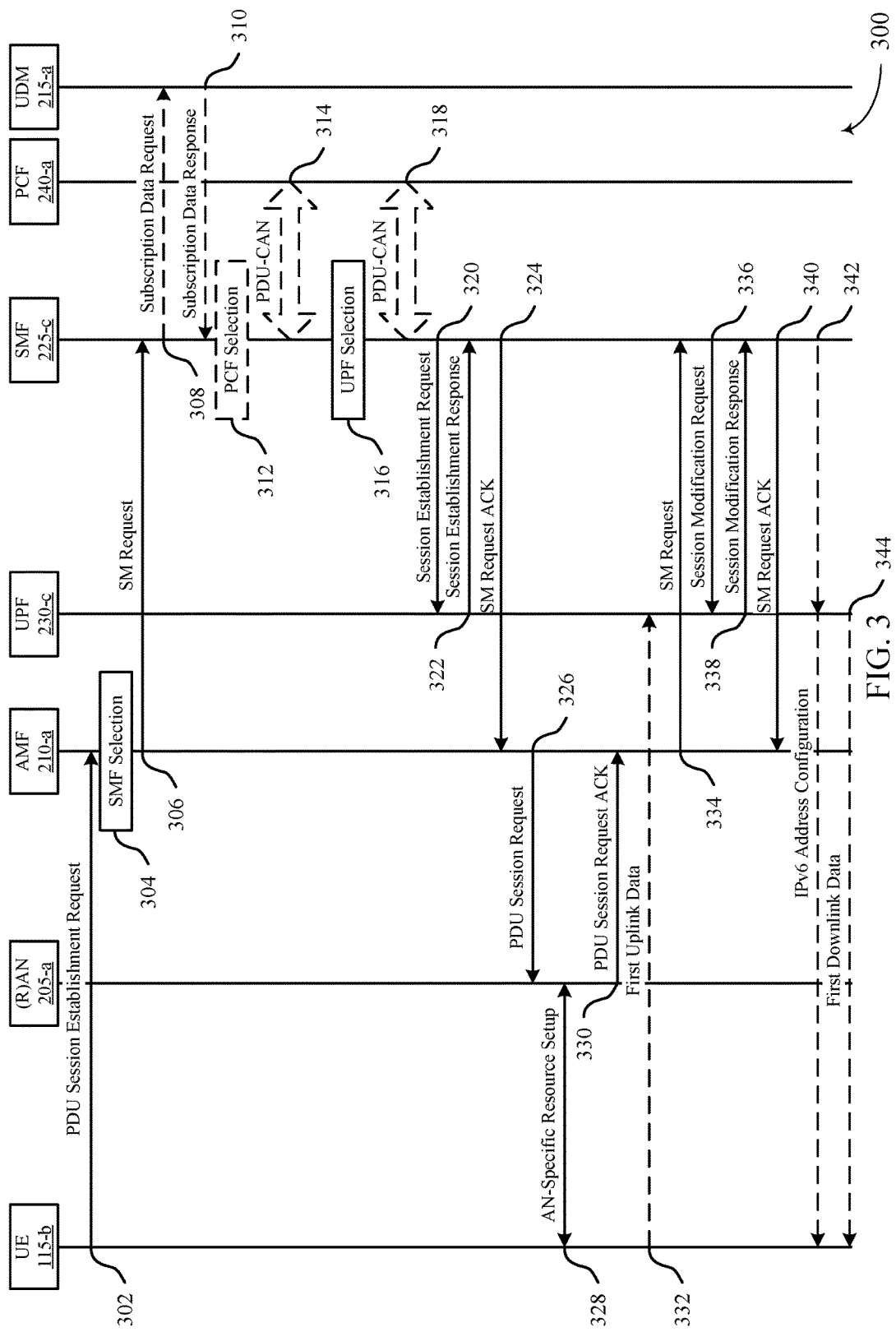
FIG. 3 illustrates an example of a process flow in a system that supports a mechanism to enable optimized user plane anchoring for minimization of user plane relocation due to UE mobility in accordance with one or more aspects of the present disclosure.

FIG. 3 illustrates an example of a process flow 300 that supports a mechanism to enable optimized user plane anchoring for minimization of user plane relocation due to UE mobility in accordance with one or more aspects of the present disclosure. Process flow 300 may include (R)AN 205-*a*, AMF 210-*a*, UPF 230-*c*, SMF 225-*c*, PCF 240-*a*, and UDM 215-*a*, which may be examples of the corresponding devices as described with reference to FIG. 2. Process flow 300 may also include UE 115-*b*, which may be an example of a UE 115 or UE 115-*a*, as described with reference to FIGS. 1 and 2. UE 115-*b* implementing user plane optimization with UE and UPF location information may initiate a modified PDU session establishment procedure to establish an association with a DN.

UE 115-*b* may have previously registered with the DN on AMF 210-*a*, and AMF 210-*a* may have obtained user subscription data for UE 115-*b* from UDM 215-*a*. Process flow 300 may illustrate a PDU session establishment procedure using various options for user plane relocation minimization. For instance, in a first option, a registration area may be determined by AMF 210-*a* (e.g., based on UE location information) that is included in an SM request, and SMF 225-*c* may select a user plane anchor to match the registration area included in the SM request. In a second option, AMF 210-*a* may refrain from sending the registration area with the SM request, and SMF 225-c may select a user plane anchor that covers a serving area, and provides information associated with the serving area to AMF 210-a, and AMF 210-a may then determine a registration area based on the received information.

In the first option for user plane relocation minimization described above, at 302, UE 115-b may transmit a NAS message, including a PDU session establishment request within SM information, to AMF 210-a. The NAS message or PDU session establishment request may include a session-NSSAI (S-NSSAI), a DNN associated with the DN, a PDU session identifier, SM information, a PDU type, an SSC mode, and protocol configuration options. Additionally, the NAS message or PDU session establishment request may include a PDU session priority value. The PDU session priority value may indicate which PDU session for AMF 210-a to select in case of a conflict between two or more PDU sessions. UE 115-b may generate and transmit a new PDU session identifier for each new or additional PDU session.

At 304, AMF 210-a may identify the PDU session identifier received in the NAS message or PDU session establishment request as a new PDU session identifier (e.g., no other existing PDU sessions of UE 115-b use the received PDU session identifier). Based on this identification, AMF 210-a may determine that the PDU session establishment request is for a new PDU session, and may select an SMF, such as SMF 225-c, for the new PDU session.

At 306, AMF 210-a may send an SM request, including the PDU session establishment request within SM NAS information, to SMF 225-c. The SM request or PDU session establishment request may include a SUPI, a DNN, an S-NSSAI, a PDU session identifier, an AMF identifier associated with AMF 210-a serving UE 115-b, SM NAS information, and an access terminal (AT) type. In the first option for user plane relocation minimization, AMF 210-a may select a registration area corresponding to UE location information. For example, AMF 210-a may send a PSAC value to SMF 225-c at 306, and may select a registration area based on the PSAC value. In such cases, the SM request (or a PDU session establishment request) may include the UE location information (e.g., a registration area, a cell identifier, a PSAC value, etc.). AMF 210-a may thus determine a registration area for UE 115-b based on the UE location information. The registration area may be selected based on an access and mobility manager session area code table, such as an AMF PSAC list, as described below. In some cases, AMF 210-a may transmit the selected registration area to UE 115-b (e.g., via (R)AN 205-a).

At 308, SMF 225-c may optionally send a subscription data request, including a SUPI and a DNN, to UDM 215-a. In some cases (e.g., if SMF 225-c previously retrieved SM-related subscription data for UE 115-b related to the DNN), SMF 225-c may refrain from sending this request.

At 310, if UDM 215-a receives a subscription data request at 308, UDM 215-a may send a subscription data response to SMF 225-c. The subscription data response may include user subscription information, including one or more authorized PDU types, one or more authorized SSC modes, a default QoS profile, or a combination of this information. The user subscription information may also include a PDU session priority. SMF 225-c may receive the subscription data response, and may select a PDU session priority for the PDU session of the PDU session establishment request. For example, SMF 225-c may receive a PDU session priority in the SM request from AMF 210-a, in the subscription data response from UDM 215-a, or in both. If SMF 225-c received two different PDU session priorities, SMF 225-c may determine a selected PDU session priority based on local policies and comparing the PDU session priority from UE 115-b with the PDU session priority from UDM 215-a. Additionally, SMF 225-c may determine whether the PDU session establishment request from UE 115-b is compliant with the user subscription information and any applicable local policies. If SMF 225-c determines that the PDU session establishment request is not compliant, SMF 225-c may transmit a NAS SM signal, including a PDU session rejection or a relevant SM rejection cause, to UE 115-b (e.g., via (R)AN 205-a). SMF 225-c may also send an indication to AMF 210-a, indicating that AMF 210-a is to consider the PDU session identifier associated with the PDU session establishment request as released. In this case, the remainder of the PDU session establishment procedure may be skipped.

At 312, if the DN implements dynamic PCC, SMF 225-c may select a PCF (e.g., PCF 240-a). In some cases, at 314, SMF 225-c may establish a PDU-connectivity access network (PDU-CAN) session with PCF 240-a. Based on the PDU-CAN session, SMF 225-c may receive default PCC rules for the PDU session from PCF 240-a.

At 316, SMF 225-c may select a UPF (e.g., UPF 230-c) and an SSC mode for the PDU session. In some cases (e.g., if the PDU type is IP version 4 (IPv4) or IP version 6 (IPv6)), SMF 225-c may allocate an IP address (and/or an IP prefix) for the PDU session. According to the first option for user plane relocation minimization, the selected UPF 230-c may, for example, correspond to a registration area selected by AMF 210-a and included with the SM request received at 306.

In some cases, SMF 225-c may receive UE location information (e.g., included in the SM request from AMF 210-a at 306). SMF 225-c may select UPF 230-c based on the UE location information. For example, SMF 225-c may receive a session area code value (e.g., a PSAC value), and may select UPF 230-c based on a connectivity session manager session area code table, which may be an example of an SMF PSAC list (e.g., using the process described below with reference to SMF PSAC list 410 and FIG. 4) and the selected SSC mode. In some cases, SMF 225-c may receive UE location information from AMF 210-a in the SM request at 306, but may not select UPF 230-c based on the received UE location information.

At 318, if the DN implements dynamic PCC and SMF 225-c did not establish a PDU-CAN session at 314, SMF 225-c may establish a PDU-CAN session with PCF 240-a. Based on the PDU-CAN session, SMF 225-c may receive default PCC rules for the PDU session from PCF 240-a. In some cases (e.g., if the PDU type is IPv4 or IPv6), SMF 225-c may initiate PDU-CAN session modification and may send the IP address for the PDU session to PCF 240-a.

At 320, SMF 225-c may send a session establishment request to UPF 230-c. The session establishment request may include packet detection, enforcement, and reporting rules to be installed at UPF 230-c for the PDU session. In some cases, SMF 225-c may allocate core network (CN) tunnel information. In these cases, SMF 225-c may also send the CN tunnel information to UPF 230-c with the session establishment request.

At 322, UPF 230-c may send a session establishment response to SMF 225-c to acknowledge the reception of the session establishment request. In some cases, UPF 230-c may allocate the CN tunnel information. In these cases, UPF 230-c may also send the CN tunnel information to SMF 225-c with the session establishment response.

At 324, SMF 225-c may send an SM request acknowledgment (ACK) to AMF 210-a. The SM request ACK may include a PDU session identifier, a QoS profile, CN tunnel information, and SM information including a PDU session establishment accept. The PDU session establishment accept may include one or more authorized QoS rules, the selected SSC mode, or both. AMF 210-a may provide the PDU session establishment accept to UE 115-b at a later time. The QoS profile, when forwarded to (R)AN 205-a, may provide (R)AN 205-a with a map between one or more QoS parameters and one or more QoS identifiers. The CN tunnel information may correspond to a CN address of a tunnel associated with the PDU session. The SM request ACK may also include information identifying UE 115-b as the target of the SM request and which access to use towards UE 115-b. SMF 225-c may also send the selected PDU session priority to AMF 210-a. AMF 210-a may store an association between the received selected PDU session priority and an identifier of SMF 225-c.

In some examples, SMF 225-c may refrain from sending any additional location information, such as a PSAC value, to AMF 210-a. AMF 210-a may identify that no additional location information was received, and may determine that SMF 225-c selected UPF 230-c based on UE location information transmitted to SMF 225-c at 306 based on this identification. At 326, AMF 210-a may send a PDU session request to (R)AN 205-a. The PDU session request may include a NAS message with the PDU session establishment accept and other SM information received from SMF 225-c at 324.

In some cases, AMF 210-a may determine that SM information indicates multiple registration areas that are conflicting, disjoint, or incompatible. If the selected SSC mode is SSC mode 2 or SSC mode 3, AMF 210-a may select a registration area based on PDU session priority (e.g., AMF 210-a may select the registration area of the multiple registration areas with the highest PDU session priority value). Based on the selected registration area and the selected SSC mode, AMF 210-a may determine whether to transmit an updated registration area to UE 115-b. Based on the determination, AMF 210-a may transmit the updated registration area to UE 115-b (e.g., via (R)AN 205-a).

At 328, (R)AN 205-a may initiate an access network specific signaling exchange with UE 115-b. The access network specific signaling exchange may be based on information received from AMF 210-a or SMF 225-c (e.g., via AMF 210-a). In some cases, (R)AN 205-a may reconfigure a radio resource control (RRC) connection with UE 115-b to establish necessary (R)AN resources related to the one or more authorized QoS rules received at 326. (R)AN 205-a may also allocate (R)AN tunnel information for the PDU session. In some cases (e.g., if the necessary (R)AN resources are established and the (R)AN tunnel information is successfully allocated), (R)AN 205-a may transmit the NAS message, including the PDU session establishment accept, received at 326 to UE 115-b. (R)AN 205-a may also use the PDU session identifier to indicate to UE 115-b an association between the (R)AN resources and the PDU session.

At 330, (R)AN 205-a may send a PDU session request ACK, including (R)AN tunnel information, to AMF 210-a. The (R)AN tunnel information may correspond to an (R)AN address of the tunnel associated with the PDU session. At 332, UE 115-b may transmit first uplink data to the DN using UPF 230-c. At 334, AMF 210-a may send an SM request to SMF 225-c. The SM request may include the information SMF 225-c received from (R)AN 205-a at 330.

At 336, SMF 225-c may establish or modify an existing session with UPF 230-c. For example, if SMF 225-c did not establish a session with UPF 230-c at 320 and 322, SMF 225-c may send a session establishment request to UPF 230-c. If SMF 225-c did establish a session with UPF 230-c at 320 and 322, SMF 225-c may send a session modification request to UPF 230-c. The session modification request or the session establishment request may include (R)AN tunnel information, CN tunnel information, or both.

In some examples, modification of the existing session by SMF 225-c may include the selection of an additional UPF (e.g., another UPF 230, not shown) to serve the communication session. For instance, SMF 225-c may identify an additional SSC mode for an established session, and may select another user plane anchor for the additional SSC mode. In such cases, UE 115-b may be concurrently served by multiple UPFs 230 (and multiple user plane anchors). As a result, SMF 225-c may transmit a message to AMF 210-a (and to UE 115-b) based on the additional user plane anchor selected for the session.

At 338, UPF 230-c may send a response to SMF 225-c. For example, if UPF 230-c received a session establishment request at 336, UPF 230-c may send a session establishment response. In another example, if UPF 230-c received a session modification request at 336, UPF 230-c may send a session modification response. In some cases, UPF 230-c may modify its functionality based on the (R)AN tunnel information, the CN tunnel information, or both.

At 340, SMF 225-c may send an SM request acknowledgment, including identifiers for the SMF and the PDU session, to AMF 210-a. AMF 210-a may receive the SM request acknowledgment, and may store an association of the PDU session and the SMF identifier. The association may correspond to this PDU session for UE 115-b. Based on the stored association, AMF 210-a may forward relevant events (e.g., any events associated with the PDU session, such as a change in the (R)AN tunnel information or a relocation of AMF 210-a) to SMF 225-c.

At 342, SMF 225-c may, in some cases (e.g., for PDU type IPv6), generate and transmit, via UPF 230-c and (R)AN 205-a, an IPv6 address configuration to UE 115-b. The IPv6 address configuration may be referred to as a IPv6 router advertisement. At 344, UPF 230-c may transmit first downlink data, from the DN, to UE 115-b.

In the second option for user plane relocation minimization, a registration area may be selected based on information received from SMF 225-c. For example, at 302, UE 115-b may transmit a NAS message, including a PDU session establishment request within SM information, to AMF 210-a. At 304, AMF 210-a may identify the PDU session identifier received in the NAS message or PDU session establishment request as a new PDU session identifier (e.g., no existing PDU sessions of UE 115-b use the PDU session identifier). Based on this identification, AMF 210-a may determine that the PDU session establishment request is for a new PDU session, and may select an SMF, such as SMF 225-c, for the new PDU session.

At 306, AMF 210-a may send an SM request, including the PDU session establishment request within SM NAS information, to SMF 225-c. According the second option for user plane relocation minimization, AMF 210-a may refrain from selecting a registration area when sending the SM request. For instance, AMF 210-a may wait to obtain information from SMF 225-c before determining a registration area. By way of contrast to the first option described above, the SM request may not include an indication of a selected registration area in the SM request. At 308, SMF 225-c may send a subscription data request, including a SUPI and a DNN, to UDM 215-a. In some cases (e.g., if SMF 225-c previously retrieved SM-related subscription data for UE 115-b related to the DNN), SMF 225-c may not send this request.

At 310, if UDM 215-a receives a subscription data request at 308, UDM 215-a may send a subscription data response to SMF 225-c. The subscription data response may include user subscription information, including one or more authorized PDU types, one or more authorized SSC modes, a default QoS profile, or a combination of this information.

At 312, if the DN implements dynamic PCC, SMF 225-c may select a PCF (e.g., PCF 240-a). In some cases, at 314, SMF 225-c may establish a PDU-CAN session with PCF 240-a. Based on the PDU-CAN session, SMF 225-c may receive default PCC rules for the PDU session from PCF 240-a.

At 316, SMF 225-c may select a UPF (e.g., UPF 230-c) and an SSC mode for the PDU session. In some cases (e.g., if the PDU type is IPv4 or IPv6), SMF 225-c may allocate an IP address (and/or IP prefix) for the PDU session. In the second option for user plane relocation minimization, SMF 225-c may select UPF 230-c based on local policies, UE subscription information, or any other information relevant to UPF selection. That is, SMF 225-c may not receive UE location information from AMF 210-a included in the SM request at 306. In some cases, SMF 225-c may select UPF 230-c for a specific area.

At 318, if the DN implements dynamic PCC and SMF 225-c did not establish a PDU-CAN session at 314, SMF 225-c may establish a PDU-CAN session with PCF 240-a. Based on the PDU-CAN session, SMF 225-c may receive default PCC rules for the PDU session from PCF 240-a. At 320, SMF 225-c may send a session establishment request to UPF 230-c. The session establishment request may include packet detection, enforcement, and reporting rules to be installed at UPF 230-c for the PDU session.

At 322, UPF 230-c may send a session establishment response to SMF 225-c to acknowledge the reception of the session establishment request. At 324, SMF 225-c may send an SM request acknowledgment to AMF 210-a. According to the second option, SMF 225-c may provide information regarding a serving area (e.g., associated with a user plane anchor) to AMF 210-a. For example, SMF 225-c may send UPF location information, such as a PSAC value, to AMF 210-a with the SM request acknowledgment (e.g., if SMF 225-c did not receive a PSAC value from AMF 210-a, or if SMF 225-c received a PSAC value from AMF 210-a but selected a UPF that did not correspond to the PSAC value). In some examples, the SM request ACK may include a PDU session identifier, a QoS profile, CN tunnel information, and SM information including a PDU session establishment accept. The PSAC value may correspond to a "serving area" of selected UPF 230-c (e.g., based on an SMF PSAC list).

At 326, AMF 210-a may send a PDU session request to (R)AN 205-a. The PDU session request may include a NAS message with the PDU session establishment accept and other SM information received from SMF 225-c at 324. In the example of the second option for minimization of user plane relocation, AMF 210-a may select the registration area corresponding to UPF location information received from SMF 225-c (e.g., with the session establishment response at 324). For example, AMF 210-a may have received a PSAC value from SMF 225-c, and the registration area may be selected based on an access and mobility manager session area code table, such as an AMF PSAC list (e.g., using the PSAC received from SMF 225-c and the process described below with reference to AMF PSAC list 405 and FIG. 4). Accordingly, the second option may differ from the first option in that the registration area is selected based on information associated with a certain area that is received from SMF 225-c. In some cases, AMF 210-a may transmit the selected registration area to UE 115-b (e.g., via (R)AN 205-a).

At 328, (R)AN 205-a may initiate an access network specific signaling exchange with UE 115-b. The access network specific signaling exchange may be based on information received from AMF 210-a or SMF 225-c (e.g., via AMF 210-a). At 330, (R)AN 205-a may send a PDU session request ACK, including (R)AN tunnel information, to AMF 210-a. The (R)AN tunnel information may correspond to an (R)AN address of the tunnel associated with the PDU session. At 332, UE 115-b may transmit first uplink data to the DN using UPF 230-c. At 334, AMF 210-a may send an SM request to SMF 225-c. The SM request may include the information SMF 225-c received from (R)AN 205-a at 330.

At 336, SMF 225-c may establish or modify an existing session with UPF 230-c. If SMF 225-c did establish a session with UPF 230-c at 320 and 322, SMF 225-c may send a session modification request to UPF 230-c. At 338, UPF 230-c may send a response to SMF 225-c. At 340, SMF 225-c may send an SM request acknowledgment, including identifier for the SMF and the PDU session, to AMF 210-a. AMF 210-a may receive the SM request acknowledgment, and may store an association of the PDU session and the SMF identifier. At 342, SMF 225-c may in some cases (e.g., for PDU type IPv6) generate and transmit, via UPF 230-c and (R)AN 205-a, an IPv6 address configuration to UE 115-b. At 344, UPF 230-c may transmit first downlink data, from the DN, to UE 115-b.

Figure 4:
FIG. 4 illustrates an example of session area code lists that support a mechanism to enable optimized user plane anchoring for minimization of user plane relocation due to UE mobility in accordance with one or more aspects of the present disclosure.

FIG. 4 illustrates an example of session area code lists 400 that support a mechanism to enable optimized user plane anchoring for minimization of user plane relocation due to UE mobility in accordance with one or more aspects of the present disclosure. An AMF, such as an AMF 210 as described with reference to FIGS. 2 and 3, may use an AMF PSAC list 405, which may be an example of an access and mobility manager session area code table. The AMF PSAC list 405 may include multiple rows, where each row may include a PSAC value 415, and an associated registration area 420. An SMF, such as an SMF 225 as described with reference to FIGS. 2 and 3, may use an SMF PSAC list 410, which may be an example of a connectivity session manager session area code table. The SMF PSAC list 410 may also include multiple rows, with each row including a PSAC value 415, and each PSAC value 415 may indicate one or more UPFs 425, which may be examples of UPFs 230 as described with reference to FIGS. 2 and 3. In some cases, a PSAC value 415 may not indicate any UPF 425. In some cases, an AMF and an SMF may implement PSAC values 415 and PSAC lists to indicate UE and UPF location information. The AMF and SMF may use the UE and UPF location information to optimize user plane functions for a UE 115, such as a UE 115, UE 115-a. and UE 115-b as described with reference to FIGS. 1 through 3, in a PDU session.

A DN may configure the AMF PSAC list 405 and the SMF PSAC list 410. The AMF PSAC list 405 may include a map between PSAC values 415 and registration areas 420. The SMF PSAC list 410 may include a mapping between PSAC values 415 and UPFs 425. The UPFs 425 indicated by a PSAC value 415 (e.g., UPF 425-a and UPF 425-b indicated by PSAC value 415-a) in the SMF PSAC list 410 may provide DN connectivity without UPF relocation to a UE 115 within the registration area 420 indicated in the AMF PSAC list 405 by the same PSAC value 415 (e.g., registration area 420-a indicated by PSAC value 415-a). In some cases, the DN may standardize the PSAC values 415 in the AMF PSAC list 405 and the SMF PSAC list 410. For example, PSAC value 415-a in the AMF PSAC list 405 may directly correspond to PSAC value 415-a in the SMF PSAC list 410. In other cases, the DN may configure the AMF and the SMF for interoperability, whether or not the PSAC values 415 are standardized.

The AMF may assign a registration area 420 to the UE 115 based on a PSAC value 415. For example, the AMF may send a PSAC value 415 (e.g., PSAC value 415-a) to the SMF indicating a location of the UE 115. In some cases, the SMF may select a UPF 425 based on the received PSAC value 415. For example, the SMF may select UPF 425-a from a set of UPFs 425 (e.g., UPF 425-a and UPF 425-b) indicated by received PSAC value 415-a in the SMF PSAC list 410. In other cases, the SMF may select a UPF 425 independent of a received PSAC value 415 (e.g., based on the SMF not receiving a PSAC value 415 from the AMF, local policies, a UE subscription, etc.). For example, the SMF may receive PSAC value 415-a from the AMF, but may select UPF 425-c based on local policies. In these cases, the SMF may determine a PSAC value 415 indicating the selected UPF 425 in the SMF PSAC list 410 (e.g., PSAC value 415-b indicating UPF 425-c), and may send the determined PSAC value 415 and the SSC mode of the PDU session to the AMF.

If the AMF receives a PSAC value 415 from the SMF, the AMF may determine a registration area 420 based on the received PSAC value 415 and SSC mode. For example, the AMF may identify registration area 420-b indicated by received PSAC value 415-b in the AMF PSAC list 405, and may determine whether indicated registration area 420-b is sufficient for the UE 115 based on the SSC mode. If the AMF does not receive a PSAC value 415 from the SMF, the AMF may determine that the SMF selected a UPF 425 based on the PSAC value 415 the AMF sent to the SMF. In this case, the AMF may identify a registration area 420 indicated by the PSAC value 415 the AMF sent to the SMF (e.g., if the AMF sent PSAC value 415-a to the SMF, and did not receive a PSAC value 415 back from the SMF, the AMF may identify registration area 420-a based on PSAC value 415-a). The AMF may transmit the identified registration area 420 to the UE 115. In some cases, the UE 115 may register in the DN with the AMF without establishing a PDU session. In these cases, the AMF may determine a registration area 420 for the UE 115 based on AMF policies. The AMF may later update the registration area 420 based on PSAC values 415 when the UE 115 initiates a PDU session.

In some cases, a UE 115 may request a second PDU session while maintaining a first PDU session. The UE 115 may transmit a PDU session establishment request to the AMF, and the AMF may select an SMF. The selected SMF may select a UPF 425 (e.g. based on a PSAC value 415 received from the AMF, or based on local policies or a UE subscription). In some cases, the selected SMF may send a PSAC value 415 corresponding to the selected UPF 425 and a selected SSC mode for the second PDU session to the AMF. The AMF may determine a modified registration area based on the PSAC value 415, the selected SSC mode, and a registration area 420 for the first PDU session. In some cases, the AMF may determine that the registration area 420 for the first PDU session may be used for the second PDU session without modification. The AMF may transmit the modified or unmodified registration area to the UE 115 for the second PDU session.

A UE 115 may implement a PDU session priority to avoid conflicts between PDU sessions. Each PDU session between the UE 115 and a same DN may include a PDU session priority value associated with the DNN of the DN. In some cases, the UE 115 may set the PDU session priority value within a PDU session establishment request. In other cases, PDU session priority values may be stored in a UDM, such as a UDM 215 as described with reference to FIGS. 2 and 3, along with subscription information. An AMF and SMF may receive the PDU session priority value, either from the UE 115 or the UDM. In some cases, multiple PDU sessions may have conflicting requirements and disjoint registration areas 420. If the SSC mode of the multiple PDU sessions are both SSC mode 2 or SSC mode 3, the AMF may determine the registration area 420 for the UE 115 based on the PDU session priority. The AMF may select the PDU session with the highest PDU session priority value, and the associated registration area 420.

Figure 5:
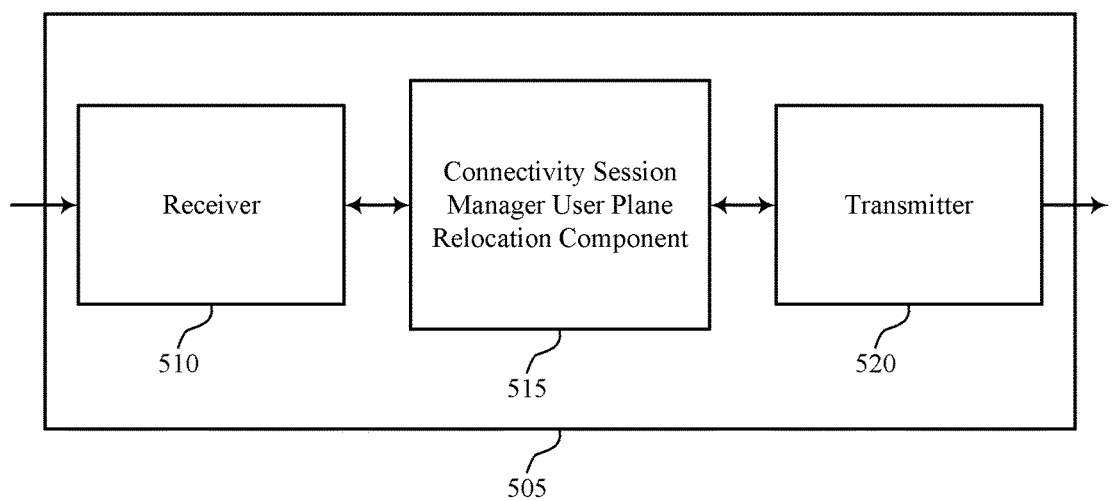
FIGS. 5 through 7 show block diagrams of a device that supports a mechanism to enable optimized user plane anchoring for minimization of user plane relocation due to UE mobility in accordance with one or more aspects of the present disclosure.

FIG. 5 shows a block diagram 500 of a device 505 that supports a mechanism to enable optimized user plane anchoring for minimization of user plane relocation due to UE mobility in accordance with one or more aspects of the present disclosure. Device 505 may be an example of aspects of a connectivity session manager (e.g., an SMF) as described with reference to FIGS. 1 through 3. Device 505 may include receiver 510, connectivity session manager user plane relocation component 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to minimization of user plane relocation due to user equipment mobility, etc.). Information may be passed on to other components of the device. The receiver 510 may be an example of aspects of the transceiver 835 described with reference to FIG. 8.

Connectivity session manager user plane relocation component 515 may be an example of aspects of the connectivity session manager user plane relocation component 815 described with reference to FIG. 8. Connectivity session manager user plane relocation component 515 and/or at least some of its various sub-components may be implemented in hardware, software executed by a processor, firmware, or any combination thereof. If implemented in software executed by a processor, the functions of the connectivity session manager user plane relocation component 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The connectivity session manager user plane relocation component 515 and/or at least some of its various sub-components may be physically located at various positions, including being distributed such that portions of functions are implemented at different physical locations by one or more physical devices. In some examples, connectivity session manager user plane relocation component 515 and/or at least some of its various sub-components may be a separate and distinct component in accordance with one or more aspects of the present disclosure. In other examples, connectivity session manager user plane relocation component 515 and/or at least some of its various sub-components may be combined with one or more other hardware components, including but not limited to an input/output (I/O) component, a transceiver, a network server, another computing device, one or more other components described in the present disclosure, or a combination thereof in accordance with one or more aspects of the present disclosure.

Connectivity session manager user plane relocation component 515 may receive a request message including a session management request for establishing a communication session for a UE 115 and first information about the communication session. Connectivity session manager user plane relocation component 515 may identify a continuity mode based on the received session management request, select a user plane anchor to serve the communication session for the UE 115 according to the identified continuity mode, and transmit a response message based on the selected user plane anchor, the response message including a session management response and response communication session information that includes at least an indication of the identified continuity mode.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
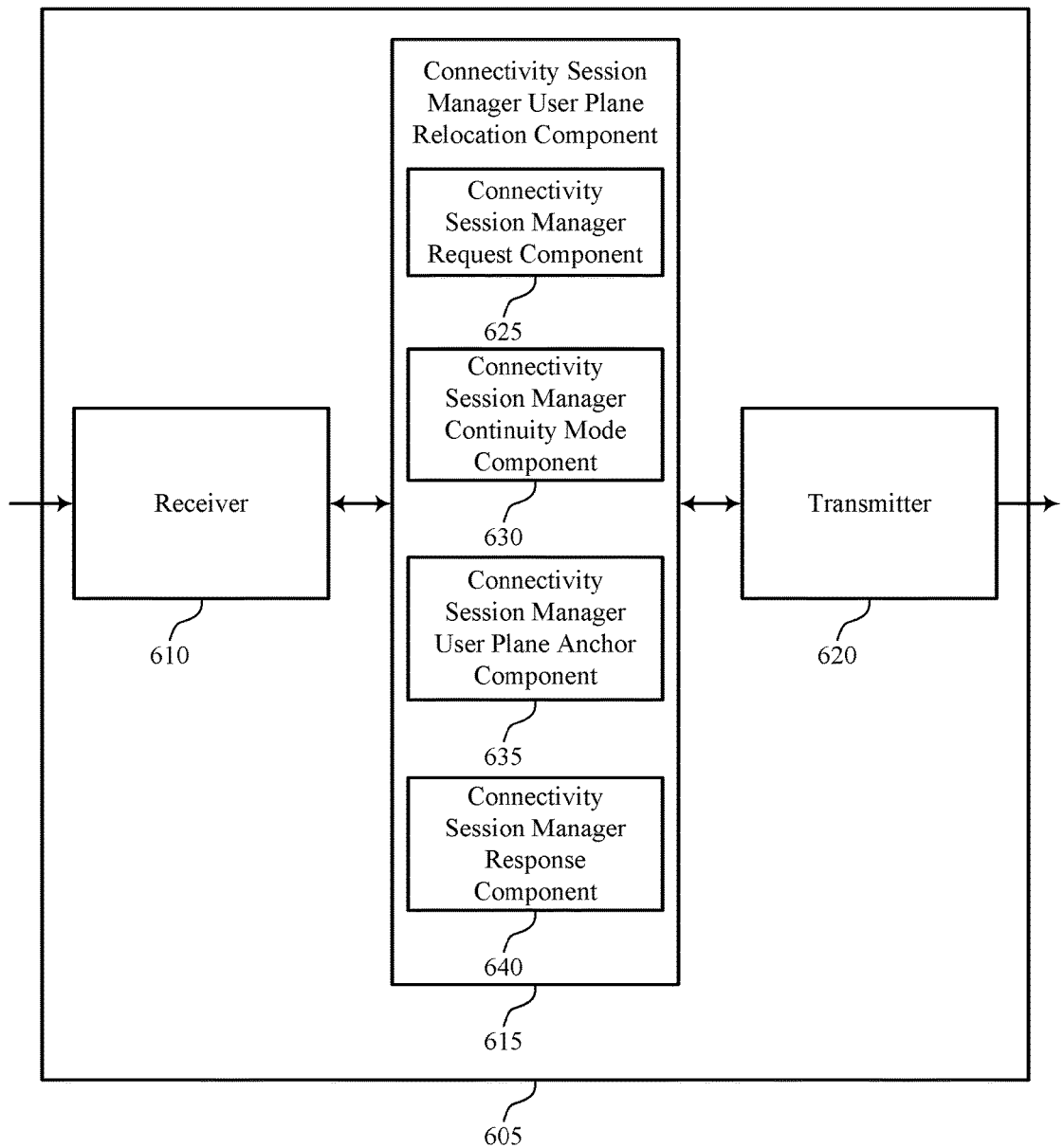

FIG. 6 shows a block diagram 600 of a device 605 that supports a mechanism to enable optimized user plane anchoring for minimization of user plane relocation due to UE mobility in accordance with one or more aspects of the present disclosure. Device 605 may be an example of aspects of a device 505 or a connectivity session manager, such as an SMF, as described with reference to FIGS. 1, 2, 3, and 5. Device 605 may include receiver 610, connectivity session manager user plane relocation component 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to minimization of user plane relocation due to user equipment mobility, etc.). Information may be passed on to other components of the device. The receiver 610 may be an example of aspects of the transceiver 835 described with reference to FIG. 8.

Connectivity session manager user plane relocation component 615 may be an example of aspects of the connectivity session manager user plane relocation component 815 described with reference to FIG. 8. Connectivity session manager user plane relocation component 615 may also include connectivity session manager request component 625, connectivity session manager continuity mode component 630, connectivity session manager user plane anchor component 635, and connectivity session manager response component 640.

Connectivity session manager request component 625 may receive a request message including a session management request for establishing a communication session for a UE 115 and first information about the communication session. In some cases, the first information about the communication session includes UE location information that includes a registration area, a cell ID, a proposed session area code value, or a combination thereof. In some cases, the session management request includes a proposed session priority requested by the UE 115 and associated with the communication session. In some cases, the communication session includes a PDU session. In some cases, the request message is received from an access and mobility manager. Connectivity session manager continuity mode component 630 may identify a continuity mode based on the received session management request. In some cases, the continuity mode includes an SSC. Additionally or alternatively, connectivity session manager continuity mode component 630 may identify a second (e.g., an additional) continuity mode for the communication session.

Connectivity session manager user plane anchor component 635 may select a user plane anchor to serve the communication session for the UE 115 according to the identified continuity mode and select the user plane anchor based on the local policy, the UE subscription, or both and according to the identified continuity mode. In some examples, connectivity session manager user plane anchor component 635 may select a second user plan anchor to serve the communication session according to the identified second continuity mode. In some cases, selecting the user plane anchor includes determining the user plane anchor based on a local policy, a UE subscription, the first information about the communication session, or a combination thereof. In some cases, selecting the user plane anchor includes determining, using a session area code table, the user plane anchor from a set of user plane anchors that correspond to the proposed session area code value and the identified continuity mode. In some cases, selecting the user plane anchor includes discarding the proposed session area code value based on a local policy, a UE subscription, or both.

Connectivity session manager response component 640 may transmit a response message based on the selected user plane anchor, the response message including a session management response and response communication session information that includes at least an indication of the identified continuity mode and transmit, as part of the response communication session information, a selected session priority based on the proposed session priority. In some cases, the response communication session information includes an indication of the determined session area code. In some cases, the response communication session information includes an indication of whether the identified continuity mode should be considered for determining a registration area. In some cases, the response message is transmitted to an access and mobility manager. In some examples, connectivity session manager response component 640 may transmit a message based on the selected second user plane anchor.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
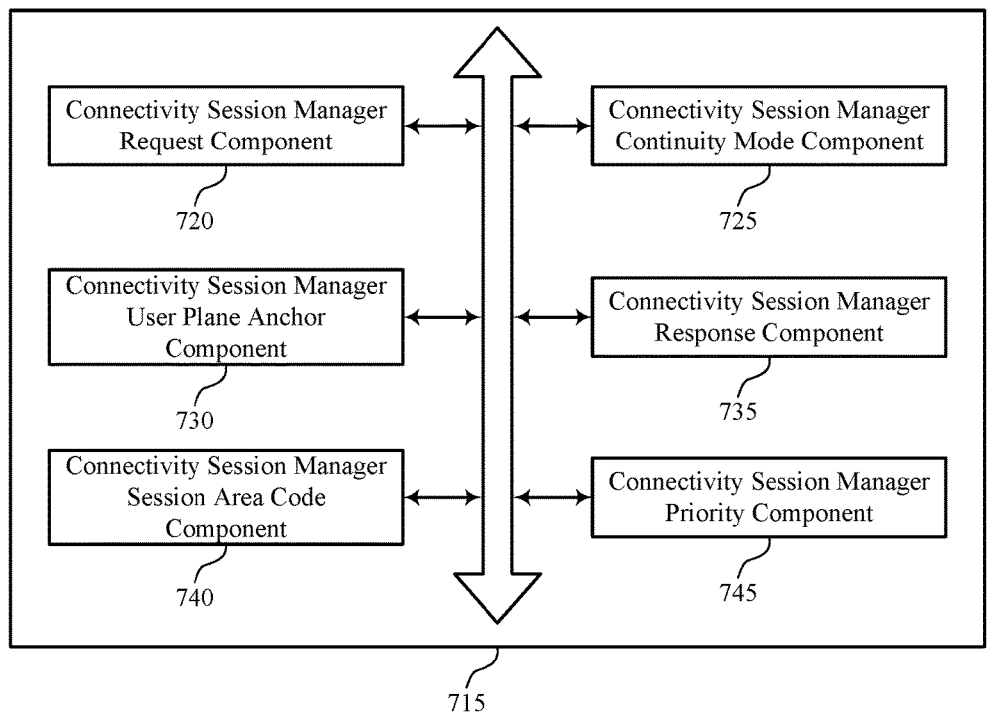

FIG. 7 shows a block diagram 700 of a connectivity session manager user plane relocation component 715 that supports a mechanism to enable optimized user plane anchoring for minimization of user plane relocation due to UE mobility in accordance with one or more aspects of the present disclosure. The connectivity session manager user plane relocation component 715 may be an example of aspects of a connectivity session manager user plane relocation component 515, a connectivity session manager user plane relocation component 615, or a connectivity session manager user plane relocation component 815 described with reference to FIGS. 5, 6, and 8. The connectivity session manager user plane relocation component 715 may include connectivity session manager request component 720, connectivity session manager continuity mode component 725, connectivity session manager user plane anchor component 730, connectivity session manager response component 735, connectivity session manager session area code component 740, and connectivity session manager priority component 745. Each of these modules may communicate, directly or indirectly, with one another (e.g., via one or more buses).

Connectivity session manager request component 720 may receive a request message including a session management request for establishing a communication session for a UE 115 and first information about the communication session. In some cases, the first information about the communication session includes UE location information that includes a registration area, a cell ID, a proposed session area code value, or a combination thereof. In some cases, the session management request includes a proposed session priority requested by the UE 115 and associated with the communication session. In some cases, the communication session includes a PDU session. In some cases, the request message is received from an access and mobility manager. Connectivity session manager continuity mode component 725 may identify a continuity mode based on the received session management request. In some cases, the continuity mode includes an SSC. Additionally or alternatively, connectivity session manager continuity mode component 725 may identify a second (e.g., an additional) continuity mode for the communication session.

Connectivity session manager user plane anchor component 730 may select a user plane anchor to serve the communication session for the UE 115 according to the identified continuity mode and select the user plane anchor based on the local policy, the UE subscription, or both and according to the identified continuity mode. In some examples, connectivity session manager user plane anchor component 730 may select a second user plan anchor to serve the communication session according to the identified second continuity mode. In some cases, selecting the user plane anchor includes determining the user plane anchor based on a local policy, a UE subscription, the first information about the communication session, or a combination thereof. In some cases, selecting the user plane anchor includes determining, using a session area code table, the user plane anchor from a set of user plane anchors that correspond to the proposed session area code value and the identified continuity mode. In some cases, selecting the user plane anchor includes discarding the proposed session area code value based on a local policy, a UE subscription, or both.

Connectivity session manager response component 735 may transmit a response message based on the selected user plane anchor, the response message including a session management response and response communication session information that includes at least an indication of the identified continuity mode and transmit, as part of the response communication session information, a selected session priority based on the proposed session priority. In some examples, connectivity session manager response component 735 may transmit a message based on the selected second user plane anchor. In some cases, the response communication session information includes an indication of the determined session area code. In some cases, the response communication session information includes an indication of whether the identified continuity mode should be considered for determining a registration area. In some cases, the response message is transmitted to an access and mobility manager.

Connectivity session manager session area code component 740 may determine a session area code value based on the selected user plane anchor and the identified continuity mode. In some cases, determining the session area code value includes determining, using a connectivity session manager session area code table, the session area code value corresponding to the selected user plane anchor and the identified continuity mode. Connectivity session manager priority component 745 may receive a subscribed session priority from unified data management, compare the proposed session priority with the subscribed session priority, and determine the selected session priority based on the comparison.

Figure 8:
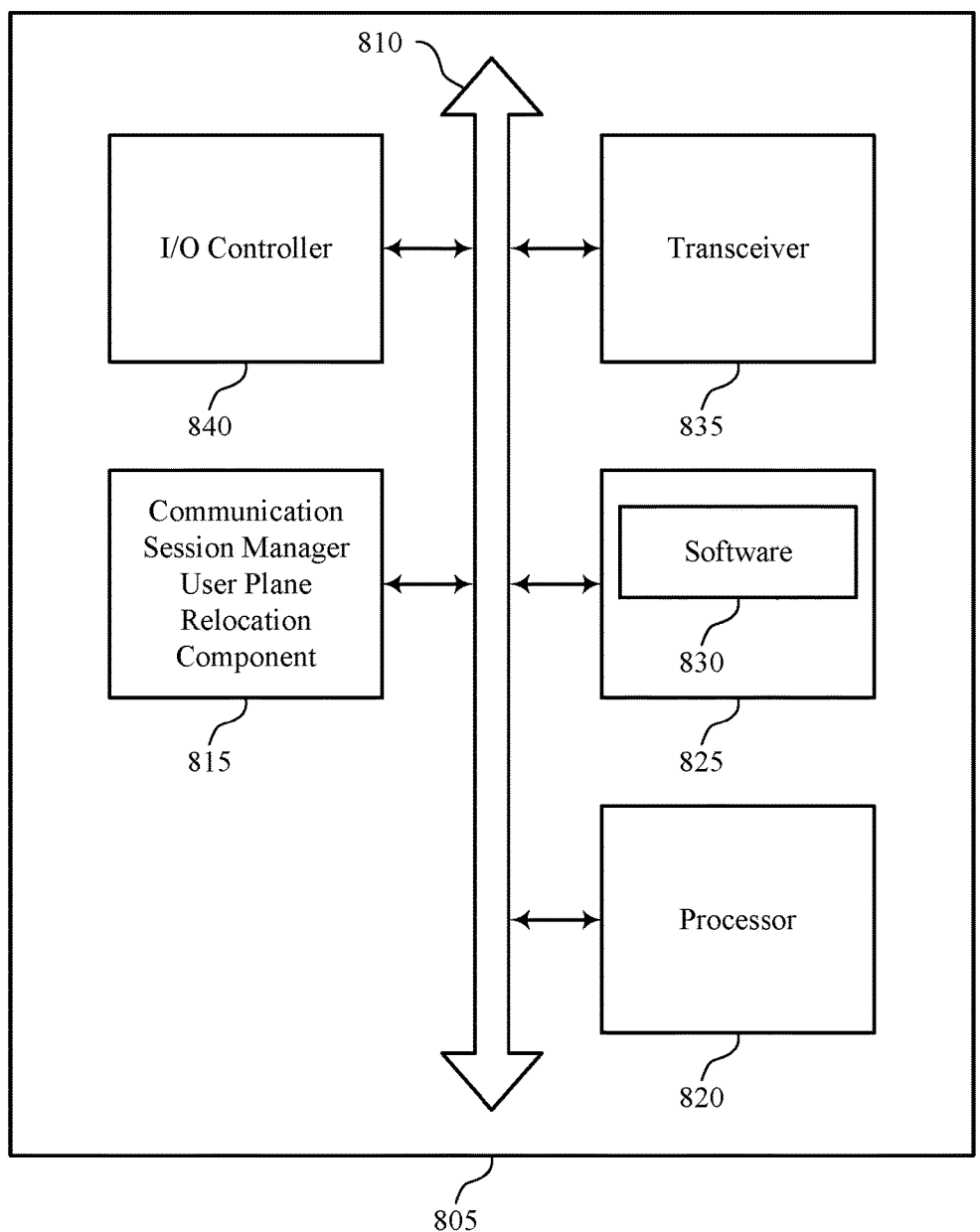
FIG. 8 illustrates a block diagram of a system including a connectivity session manager that supports a mechanism to enable optimized user plane anchoring for minimization of user plane relocation due to UE mobility in accordance with one or more aspects of the present disclosure.

FIG. 8 shows a diagram of a system 800 including a device 805 that supports a mechanism to enable optimized user plane anchoring for minimization of user plane relocation due to UE mobility in accordance with one or more aspects of the present disclosure. Device 805 may be an example of or include the components of device 505, device 605, or a connectivity session manager as described above, e.g., with reference to FIGS. 1, 2, 3, 5, and 6. Device 805 may include components for bi-directional voice and data communications including components for transmitting and receiving communications, including connectivity session manager user plane relocation component 815, processor 820, memory 825, software 830, transceiver 835, and I/O controller 840. These components may be in electronic communication via one or more busses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting minimization of user plane relocation due to user equipment mobility).

Memory 825 may include random-access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support minimization of user plane relocation due to user equipment mobility. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
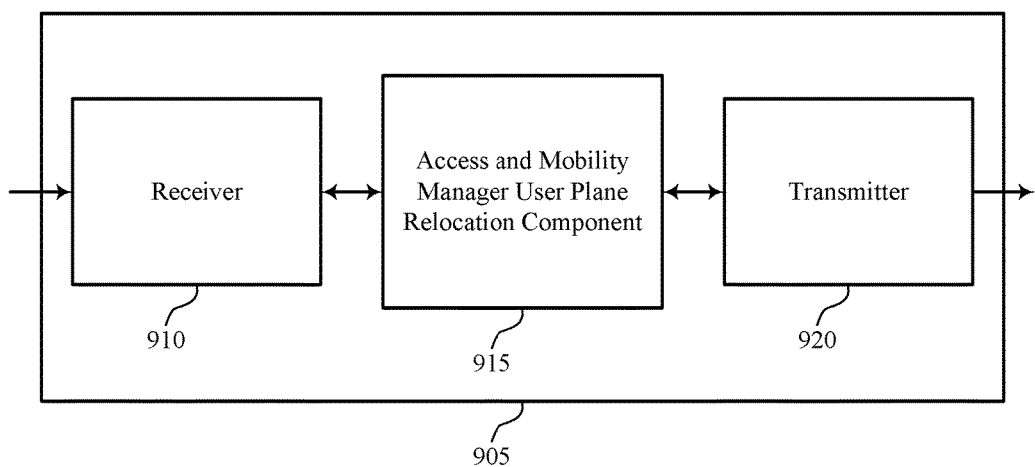
FIGS. 9 through 11 show block diagrams of a device that supports a mechanism to enable optimized user plane anchoring for minimization of user plane relocation due to UE mobility in accordance with one or more aspects of the present disclosure.

FIG. 9 shows a block diagram 900 of a device 905 that supports a mechanism to enable optimized user plane anchoring for minimization of user plane relocation due to UE mobility in accordance with one or more aspects of the present disclosure. Device 905 may be an example of aspects of an access and mobility manager (such as an AMF) as described with reference to FIGS. 1 and 2. Device 905 may include receiver 910, access and mobility manager user plane relocation component 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to minimization of user plane relocation due to user equipment mobility, etc.). Information may be passed on to other components of the device. The receiver 910 may be an example of aspects of the transceiver 1235 described with reference to FIG. 12.

Access and mobility manager user plane relocation component 915 may be an example of aspects of the access and mobility manager user plane relocation component 1215 described with reference to FIG. 12. Access and mobility manager user plane relocation component 915 and/or at least some of its various sub-components may be implemented in hardware, software executed by a processor, firmware, or any combination thereof. If implemented in software executed by a processor, the functions of the access and mobility manager user plane relocation component 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The access and mobility manager user plane relocation component 915 and/or at least some of its various sub-components may be physically located at various positions, including being distributed such that portions of functions are implemented at different physical locations by one or more physical devices. In some examples, access and mobility manager user plane relocation component 915 and/or at least some of its various sub-components may be a separate and distinct component in accordance with one or more aspects of the present disclosure. In other examples, access and mobility manager user plane relocation component 915 and/or at least some of its various sub-components may be combined with one or more other hardware components, including but not limited to an I/O component, a transceiver, a network server, another computing device, one or more other components described in the present disclosure, or a combination thereof in accordance with one or more aspects of the present disclosure.

Access and mobility manager user plane relocation component 915 may receive a session management request to establish a communication session for a UE 115, transmit a request message including the session management request and first information about the communication session, receive a response message including a session management response and response communication session information that includes at least a continuity mode, and determine a registration area for the UE 115 based on the response communication session information.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
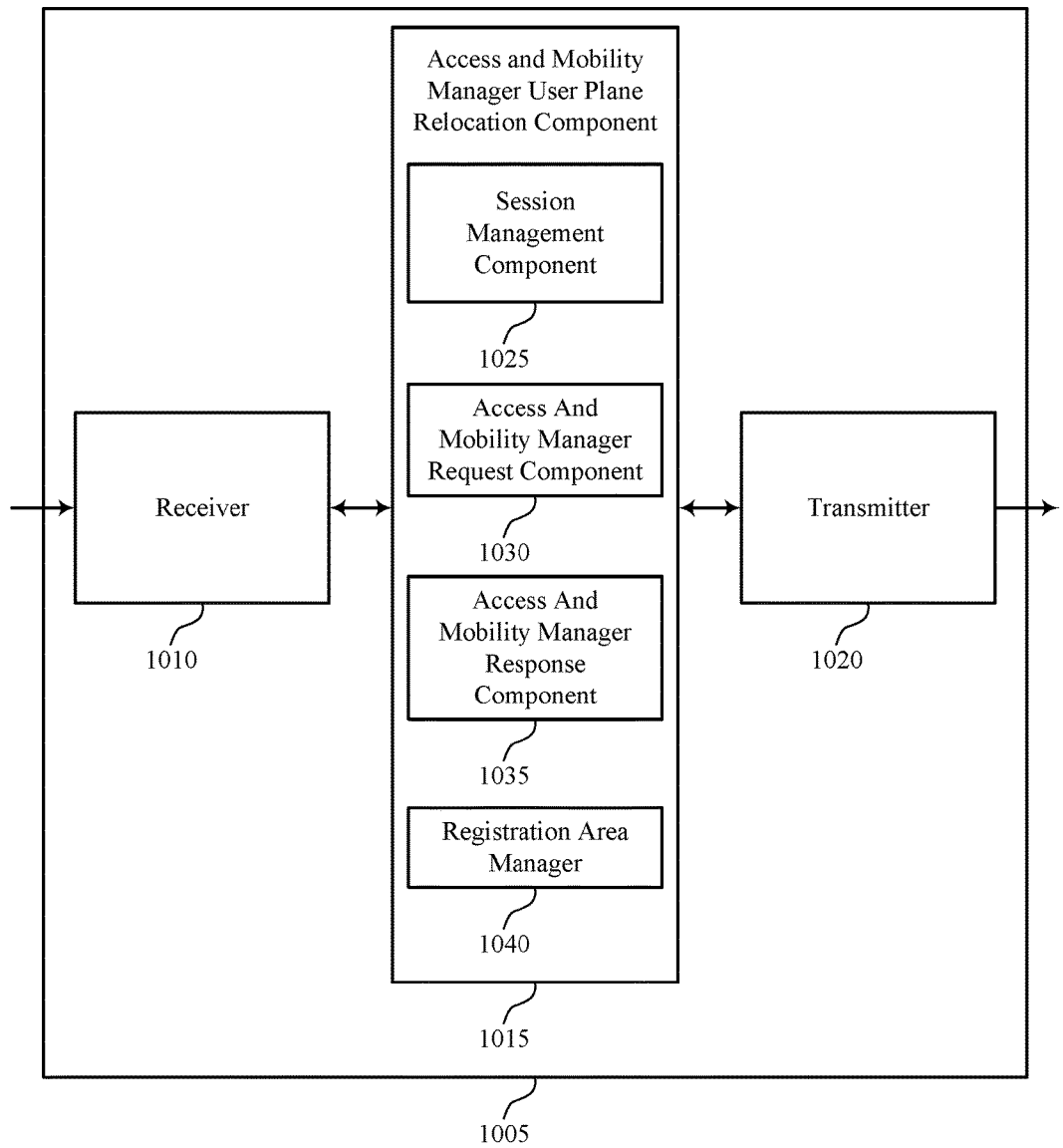

FIG. 10 shows a block diagram 1000 of a device 1005 that supports a mechanism to enable optimized user plane anchoring for minimization of user plane relocation due to UE mobility in accordance with one or more aspects of the present disclosure. Device 1005 may be an example of aspects of a device 905 or an access and mobility manager (e.g., an AMF) as described with reference to FIGS. 1, 2, 3, and 9. Device 1005 may include receiver 1010, access and mobility manager user plane relocation component 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to minimization of user plane relocation due to user equipment mobility, etc.). Information may be passed on to other components of the device. The receiver 1010 may be an example of aspects of the transceiver 1235 described with reference to FIG. 12.

Access and mobility manager user plane relocation component 1015 may be an example of aspects of the access and mobility manager user plane relocation component 1215 described with reference to FIG. 12. Access and mobility manager user plane relocation component 1015 may also include session management component 1025, access and mobility manager request component 1030, access and mobility manager response component 1035, and registration area manager 1040.

Session management component 1025 may receive a session management request to establish a communication session for a UE 115. Access and mobility manager request component 1030 may include the session area code value in the first information about the communication session and transmit a request message including the session management request and first information about the communication session. In some cases, the request message is transmitted to a connectivity session manager.

Access and mobility manager response component 1035 may receive a response message including a session management response and response communication session information that includes at least a continuity mode. In some cases, the response communication session information includes an indication of a second session area code value. In some cases, the response communication session information includes an indication of whether the continuity mode should be considered for determining the registration area. In some examples, the response communication session information includes a session priority associated with the communication session. In some examples, access and mobility manager response component 1035 may receive a message for a second user plan anchor to serve the communication session for the UE.

Registration area manager 1040 may determine a registration area for the UE 115 based on the response communication session information. In some cases, determining the registration area includes determining, using an access and mobility manager session area code table, the registration area corresponding to the first session area code value. Additionally or alternatively, determining the registration area may include determining, using the access and mobility manager session area code table, the registration area corresponding to the second session area code value. In some cases, determining the registration area includes determining the registration area based on the session priority. Registration area manager 1040 may also determine that a current registration area for the UE 115 is insufficient based on the determined registration area and the continuity mode, and transmit an updated registration area to the UE 115 based on the determination that the current registration area of the UE 115 is insufficient.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
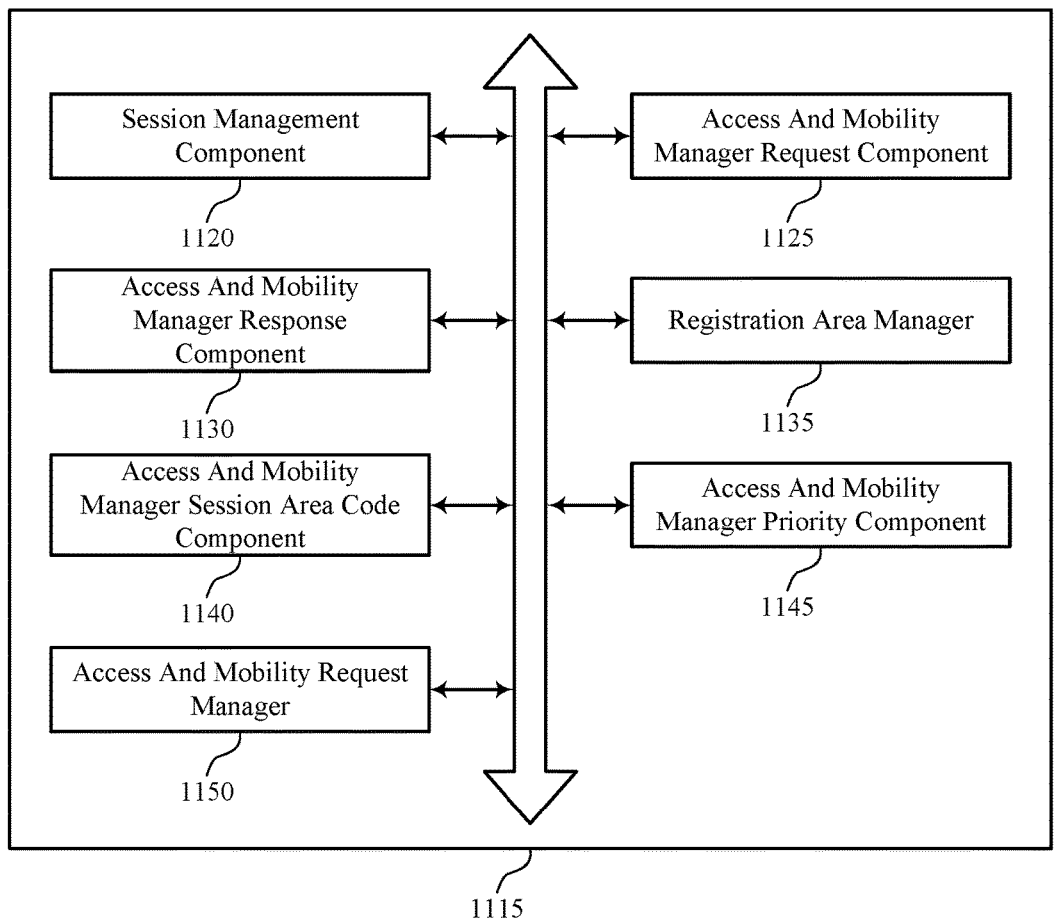

FIG. 11 shows a block diagram 1100 of an access and mobility manager user plane relocation component 1115 that supports a mechanism to enable optimized user plane anchoring for minimization of user plane relocation due to UE mobility in accordance with one or more aspects of the present disclosure. The access and mobility manager user plane relocation component 1115 may be an example of aspects of an access and mobility manager user plane relocation component 1215 described with reference to FIGS. 9, 10, and 12. The access and mobility manager user plane relocation component 1115 may include session management component 1120, access and mobility manager request component 1125, access and mobility manager response component 1130, registration area manager 1135, access and mobility manager session area code component 1140, access and mobility manager priority component 1145, and access and mobility request manager 1150. Each of these modules may communicate, directly or indirectly, with one another (e.g., via one or more buses).

Session management component 1120 may receive a session management request to establish a communication session for a UE 115. In some cases, the session management request is received from the UE 115. Access and mobility manager request component 1125 may transmit a request message including the session management request and first information about the communication session. In some cases, the request message is transmitted to a connectivity session manager.

Access and mobility manager response component 1130 may receive a response message including a session management response and response communication session information that includes at least a continuity mode. In some cases, the response communication session information includes an indication of a second session area code value. In some cases, the response communication session information includes an indication of whether the continuity mode should be considered for determining the registration area. In some cases, the response communication session information includes a session priority associated with the communication session. In some examples, access and mobility manager response component 1130 may receive a message for a second user plan anchor to serve the communication session for the UE.

Registration area manager 1135 may determine a registration area for the UE 115 based on the response communication session information, determine that a current registration area for the UE 115 is insufficient based on the determined registration area and the continuity mode, and transmit an updated registration area to the UE 115 based on the determination that the current registration area of the UE 115 is insufficient. In some cases, determining the registration area includes determining, using an access and mobility manager session area code table, the registration area corresponding to the first session area code value. Additionally or alternatively, determining the registration area may include determining, using the access and mobility manager session area code table, the registration area corresponding to the second session area code value. In some examples, determining the registration area includes determining the registration area based on the session priority. Access and mobility manager session area code component 1140 may determine a first session area code value associated with a location of the UE 115. In some cases, access and mobility manager session area code component 1140 may include the session area code value in the first information about the communication session. Access and mobility manager priority component 1145 may store the session priority.

Figure 12:
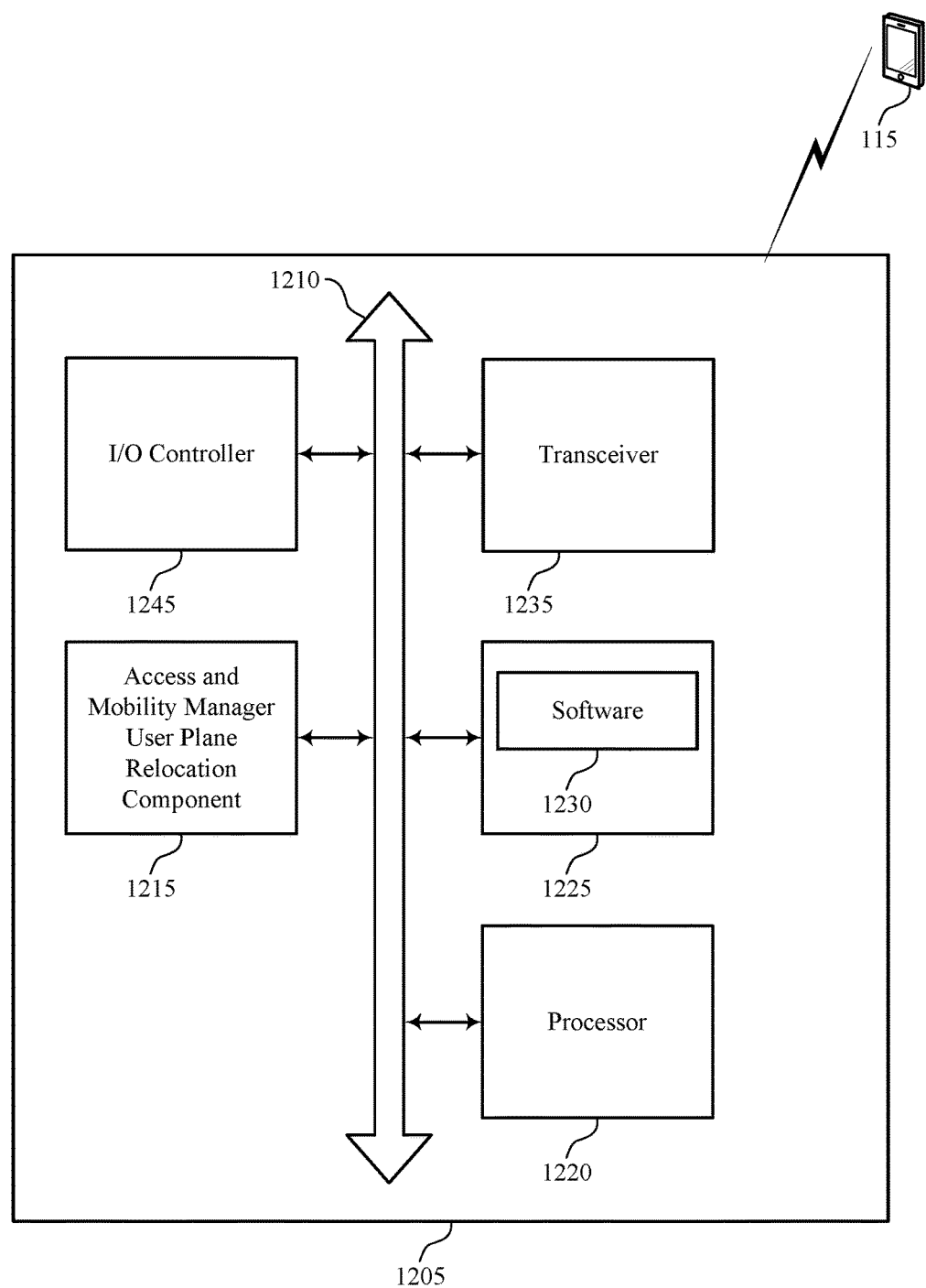
FIG. 12 illustrates a block diagram of a system including an access and mobility manager that supports a mechanism to enable optimized user plane anchoring for minimization of user plane relocation due to UE mobility in accordance with one or more aspects of the present disclosure.

FIG. 12 shows a diagram of a system 1200 including a device 1205 that supports a mechanism to enable optimized user plane anchoring for minimization of user plane relocation due to UE mobility in accordance with one or more aspects of the present disclosure. Device 1205 may be an example of or include the components of access and mobility manager as described above, e.g., with reference to FIGS. 1 through 3. Device 1205 may include components for bi-directional voice and data communications including components for transmitting and receiving communications, including access and mobility manager user plane relocation component 1215, processor 1220, memory 1225, software 1230, transceiver 1235, antenna 1240, and I/O controller 1245. These components may be in electronic communication via one or more busses (e.g., bus 1210).

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting minimization of user plane relocation due to user equipment mobility).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support minimization of user plane relocation due to user equipment mobility. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
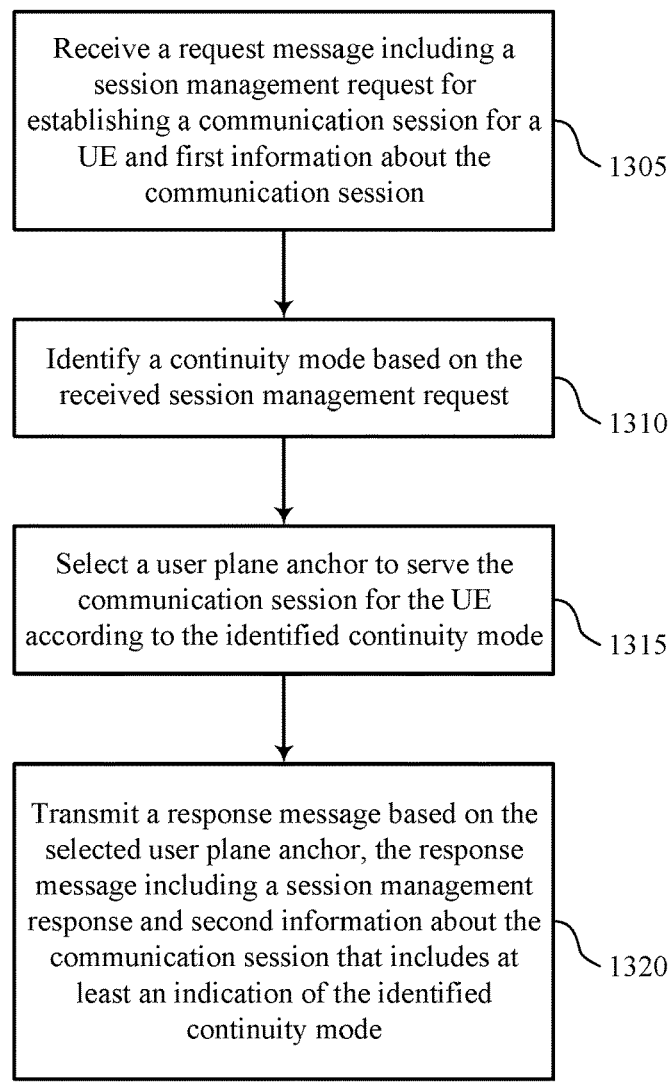
FIGS. 13 through 18 illustrate methods for a mechanism to enable optimized user plane anchoring for minimization of user plane relocation due to UE mobility in accordance with one or more aspects of the present disclosure.

FIG. 13 shows a flowchart illustrating a method 1300 for a mechanism to enable optimized user plane anchoring for minimization of user plane relocation due to UE mobility in accordance with one or more aspects of the present disclosure. The operations of method 1300 may be implemented by a connectivity session manager (such as an SMF) or its components as described herein. For example, the operations of method 1300 may be performed by a connectivity session manager user plane relocation component as described with reference to FIGS. 5 through 8. In some examples, a connectivity session manager may execute a set of codes to control the functional elements of the device to perform the functions described below. Additionally or alternatively, the connectivity session manager may perform aspects of the functions described below using special-purpose hardware.

At 1305 the connectivity session manager may receive a request message comprising a session management request for establishing a communication session for a UE 115 and first information about the communication session. The operations of 1305 may be performed according to the methods described with reference to FIGS. 1 through 3. In certain examples, aspects of the operations of 1305 may be performed by a connectivity session manager request component as described with reference to FIGS. 5 through 8.

At 1310 the connectivity session manager may identify a continuity mode for the PDU session based at least in part on the received session management request. The operations of 1310 may be performed according to the methods described with reference to FIGS. 1 through 3. In certain examples, aspects of the operations of 1310 may be performed by a connectivity session manager continuity mode component as described with reference to FIGS. 5 through 8.

At 1315 the connectivity session manager may select a user plane anchor to serve the communication session for the UE 115 according to the identified continuity mode. The operations of 1315 may be performed according to the methods described with reference to FIGS. 1 through 3. In certain examples, aspects of the operations of 1315 may be performed by a connectivity session manager user plane anchor component as described with reference to FIGS. 5 through 8.

At 1320 the connectivity session manager may transmit a response message based at least in part on the selected user plane anchor, the response message comprising a session management response and response communication session information that includes at least an indication of the identified continuity mode. The operations of 1320 may be performed according to the methods described with reference to FIGS. 1 through 3. In certain examples, aspects of the operations of 1320 may be performed by a connectivity session manager response component as described with reference to FIGS. 5 through 8.

Figure 14:
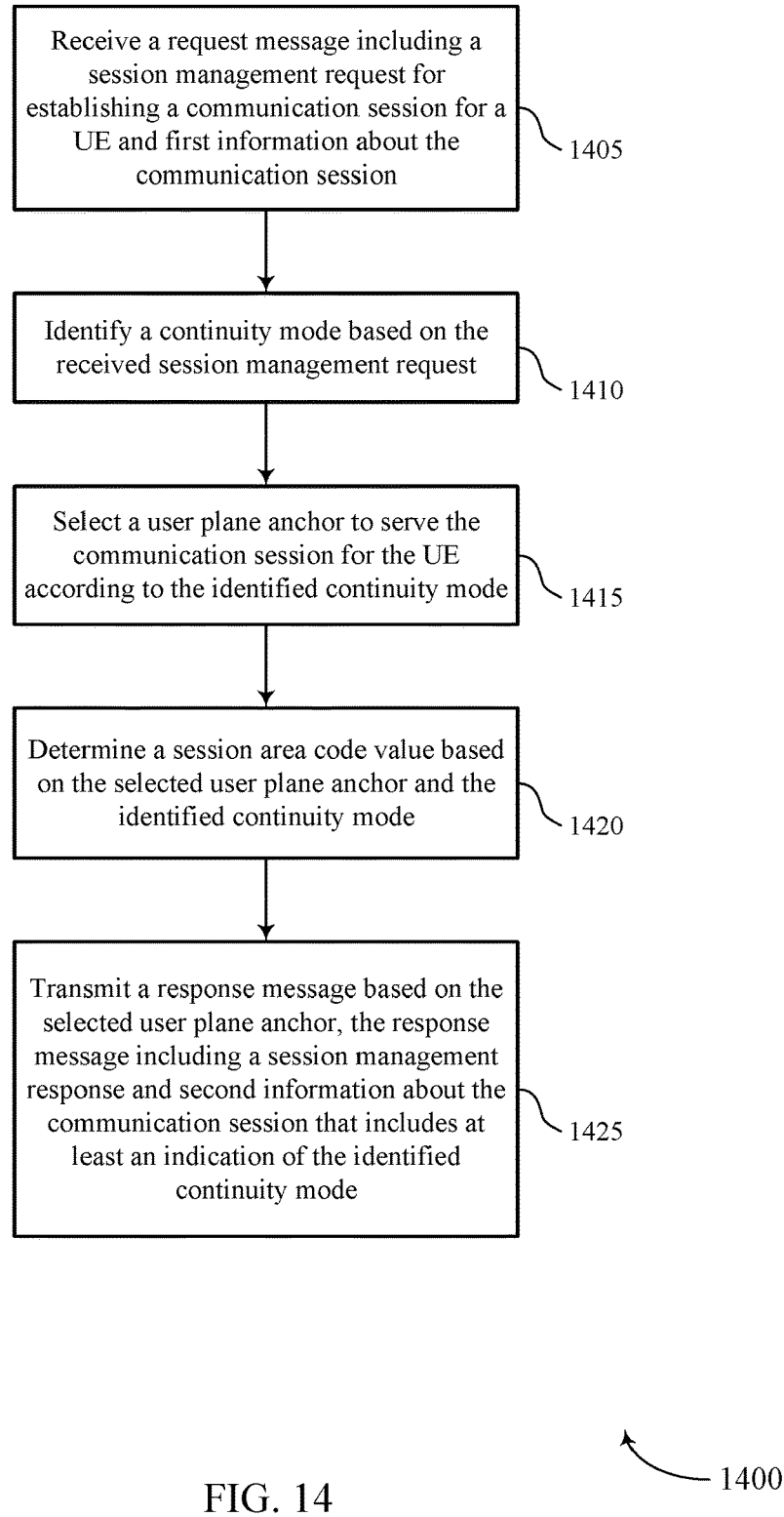

FIG. 14 shows a flowchart illustrating a method 1400 for a mechanism to enable optimized user plane anchoring for minimization of user plane relocation due to UE mobility in accordance with one or more aspects of the present disclosure. The operations of method 1400 may be implemented by a connectivity session manager or its components as described herein. For example, the operations of method 1400 may be performed by a connectivity session manager user plane relocation component as described with reference to FIGS. 5 through 8. In some examples, a connectivity session manager may execute a set of codes to control the functional elements of the device to perform the functions described below. Additionally or alternatively, the connectivity session manager may perform aspects of the functions described below using special-purpose hardware.

At 1405 the connectivity session manager may receive a request message comprising a session management request for establishing a communication session for a UE 115 and first information about the communication session. The operations of 1405 may be performed according to the methods described with reference to FIGS. 1 through 3. In certain examples, aspects of the operations of 1405 may be performed by a connectivity session manager request component as described with reference to FIGS. 5 through 8.

At 1410 the connectivity session manager may identify a continuity mode based at least in part on the received session management request. The operations of 1410 may be performed according to the methods described with reference to FIGS. 1 through 3. In certain examples, aspects of the operations of 1410 may be performed by a connectivity session manager continuity mode component as described with reference to FIGS. 5 through 8.

At 1415 the connectivity session manager may select a user plane anchor to serve the communication session for the UE 115 according to the identified continuity mode. In some examples, the connectivity session manager may use the first information about the communication session (e.g., included in the received request message) for selecting the user plane anchor. The operations of 1415 may be performed according to the methods described with reference to FIGS. 1 through 3. In certain examples, aspects of the operations of 1415 may be performed by a connectivity session manager user plane anchor component as described with reference to FIGS. 5 through 8.

At 1420 the connectivity session manager may determine a session area code value (e.g., a PSAC value) based at least in part on the selected user plane anchor and the identified continuity mode. In some examples, determining the session area code may include determining, using a connectivity session manager session area code table (e.g., an SMF PSAC table or list), the session area code value corresponding to the selected user plane anchor and the identified continuity mode. The operations of 1420 may be performed according to the methods described with reference to FIGS. 1 through 3. In certain examples, aspects of the operations of 1420 may be performed by a connectivity session manager session area code component as described with reference to FIGS. 5 through 8.

At 1425 the connectivity session manager may transmit a response message based at least in part on the selected user plane anchor, the response message comprising a session management response and response communication session information that includes at least an indication of the identified continuity mode. In some examples, the response communication session information may include the determined session area code value. The operations of 1425 may be performed according to the methods described with reference to FIGS. 1 through 3. In certain examples, aspects of the operations of 1425 may be performed by a connectivity session manager response component as described with reference to FIGS. 5 through 8.

Figure 15:
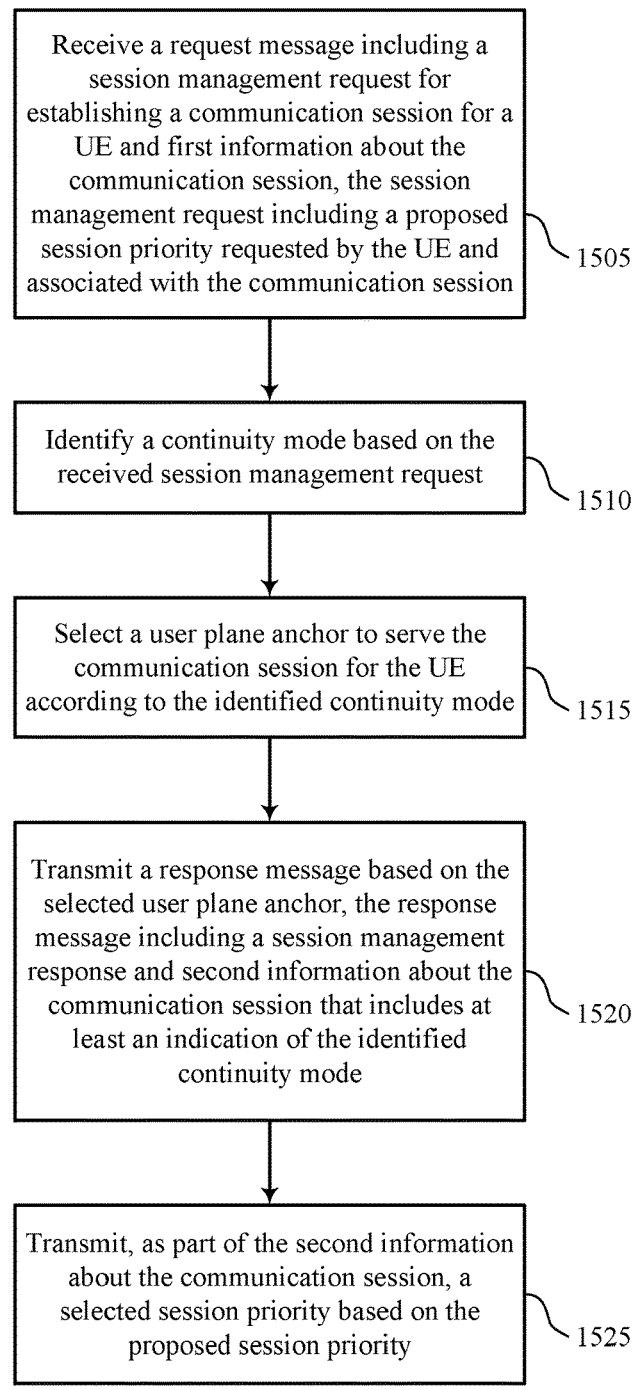

FIG. 15 shows a flowchart illustrating a method 1500 for a mechanism to enable optimized user plane anchoring for minimization of user plane relocation due to UE mobility in accordance with one or more aspects of the present disclosure. The operations of method 1500 may be implemented by a connectivity session manager or its components as described herein. For example, the operations of method 1500 may be performed by a connectivity session manager user plane relocation component as described with reference to FIGS. 5 through 8. In some examples, a connectivity session manager may execute a set of codes to control the functional elements of the device to perform the functions described below. Additionally or alternatively, the connectivity session manager may perform aspects of the functions described below using special-purpose hardware.

At 1505 the connectivity session manager may receive a request message comprising a session management request for establishing a communication session for a UE 115 and first information about the communication session, where the session management request comprises a proposed session priority requested by the UE 115 and associated with the communication session. The operations of 1505 may be performed according to the methods described with reference to FIGS. 1 through 3. In certain examples, aspects of the operations of 1505 may be performed by a connectivity session manager request component as described with reference to FIGS. 5 through 8.

At 1510 the connectivity session manager may identify a continuity mode, such as an SSC, based on the received session management request. The operations of 1510 may be performed according to the methods described with reference to FIGS. 1 through 3. In certain examples, aspects of the operations of 1510 may be performed by a connectivity session manager continuity mode component as described with reference to FIGS. 5 through 8.

At 1515 the connectivity session manager may select a user plane anchor (e.g., a UPF) to serve the communication session for the UE 115 according to the identified continuity mode. The operations of 1515 may be performed according to the methods described with reference to FIGS. 1 through 3. In certain examples, aspects of the operations of 1515 may be performed by a connectivity session manager user plane anchor component as described with reference to FIGS. 5 through 8.

At 1520 the connectivity session manager may transmit a response message based on the selected user plane anchor, the response message comprising a session management response and response communication session information that includes at least an indication of the identified continuity mode. The operations of 1520 may be performed according to the methods described with reference to FIGS. 1 through 3. In certain examples, aspects of the operations of 1520 may be performed by a connectivity session manager response component as described with reference to FIGS. 5 through 8.

At 1525 the connectivity session manager may transmit, as part of the response communication session information, a selected session priority based at least in part on the proposed session priority. The operations of 1525 may be performed according to the methods described with reference to FIGS. 1 through 3. In certain examples, aspects of the operations of 1525 may be performed by a connectivity session manager response component as described with reference to FIGS. 5 through 8.

Figure 16:
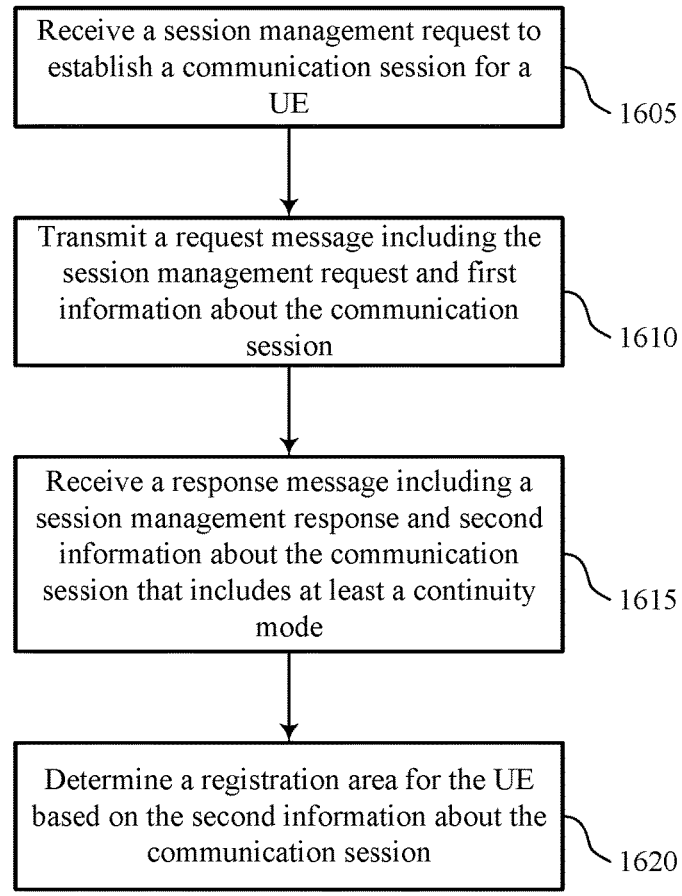

FIG. 16 shows a flowchart illustrating a method 1600 for a mechanism to enable optimized user plane anchoring for minimization of user plane relocation due to UE mobility in accordance with one or more aspects of the present disclosure. The operations of method 1600 may be implemented by an access and mobility manager or its components as described herein. For example, the operations of method 1600 may be performed by an access and mobility manager user plane relocation component as described with reference to FIGS. 9 through 12. In some examples, an access and mobility manager may execute a set of codes to control the functional elements of the device to perform the functions described below. Additionally or alternatively, the access and mobility manager may perform aspects of the functions described below using special-purpose hardware.

At 1605 the access and mobility manager may receive a session management request to establish a communication session for a UE 115. The operations of 1605 may be performed according to the methods described with reference to FIGS. 1 through 3. In certain examples, aspects of the operations of 1605 may be performed by a session management component as described with reference to FIGS. 9 through 12.

At 1610 the access and mobility manager may transmit a request message comprising the session management request and first information about the communication session. The operations of 1610 may be performed according to the methods described with reference to FIGS. 1 through 3. In certain examples, aspects of the operations of 1610 may be performed by an access and mobility manager request component as described with reference to FIGS. 9 through 12.

At 1615 the access and mobility manager may receive a response message comprising a session management response and response communication session information that includes at least a continuity mode. The operations of 1615 may be performed according to the methods described with reference to FIGS. 1 through 3. In certain examples, aspects of the operations of 1615 may be performed by an access and mobility manager response component as described with reference to FIGS. 9 through 12.

At 1620 the access and mobility manager may determine a registration area for the UE 115 based at least in part on the response communication session information. The operations of 1620 may be performed according to the methods described with reference to FIGS. 1 through 3. In certain examples, aspects of the operations of 1620 may be performed by a registration area manager as described with reference to FIGS. 9 through 12.

Figure 17:
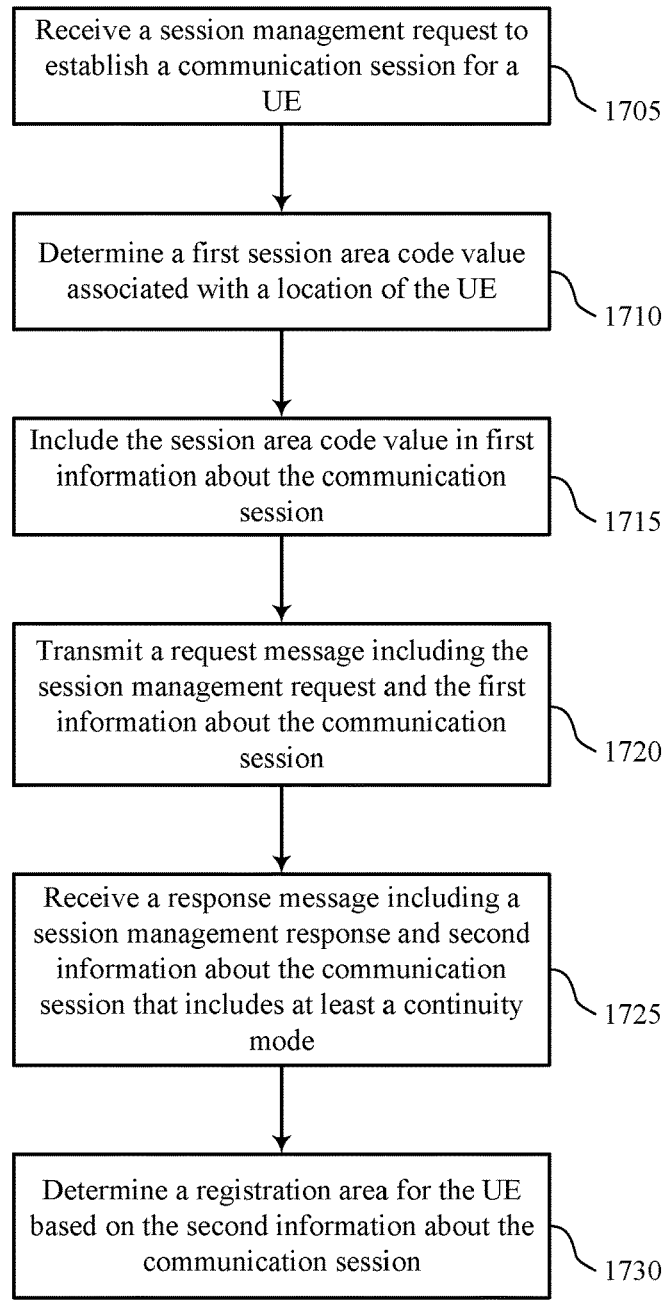

FIG. 17 shows a flowchart illustrating a method 1700 for a mechanism to enable optimized user plane anchoring for minimization of user plane relocation due to UE mobility in accordance with one or more aspects of the present disclosure. The operations of method 1700 may be implemented by an access and mobility manager or its components as described herein. For example, the operations of method 1700 may be performed by an access and mobility manager user plane relocation component as described with reference to FIGS. 9 through 12. In some examples, an access and mobility manager may execute a set of codes to control the functional elements of the device to perform the functions described below. Additionally or alternatively, the access and mobility manager may perform aspects of the functions described below using special-purpose hardware.

At 1705 the access and mobility manager may receive a session management request to establish a communication session for a UE 115. The operations of 1705 may be performed according to the methods described with reference to FIGS. 1 through 3. In certain examples, aspects of the operations of 1705 may be performed by a session management component as described with reference to FIGS. 9 through 12.

At 1710 the access and mobility manager may determine a first session area code value (e.g., a first PSAC value) associated with a location of the UE 115. The operations of 1710 may be performed according to the methods described with reference to FIGS. 1 through 3. In certain examples, aspects of the operations of 1710 may be performed by an access and mobility manager session area code component as described with reference to FIGS. 9 through 12.

At 1715 the access and mobility manager may include the session area code value in first information about the communication session. The operations of 1715 may be performed according to the methods described with reference to FIGS. 1 through 3. In certain examples, aspects of the operations of 1715 may be performed by an access and mobility manager request component as described with reference to FIGS. 9 through 12.

At 1720 the access and mobility manager may transmit a request message comprising the session management request and the first information about the communication session. The operations of 1720 may be performed according to the methods described with reference to FIGS. 1 through 3. In certain examples, aspects of the operations of 1720 may be performed by an access and mobility manager request component as described with reference to FIGS. 9 through 12.

At 1725 the access and mobility manager may receive a response message comprising a session management response and response communication session information that includes at least a continuity mode. The operations of 1725 may be performed according to the methods described with reference to FIGS. 1 through 3. In certain examples, aspects of the operations of 1725 may be performed by an access and mobility manager response component as described with reference to FIGS. 9 through 12.

At 1730 the access and mobility manager may determine a registration area for the UE 115 based at least in part on the response communication session information. The operations of 1730 may be performed according to the methods described with reference to FIGS. 1 through 3. In certain examples, aspects of the operations of 1730 may be performed by a registration area manager as described with reference to FIGS. 9 through 12.

Figure 18:
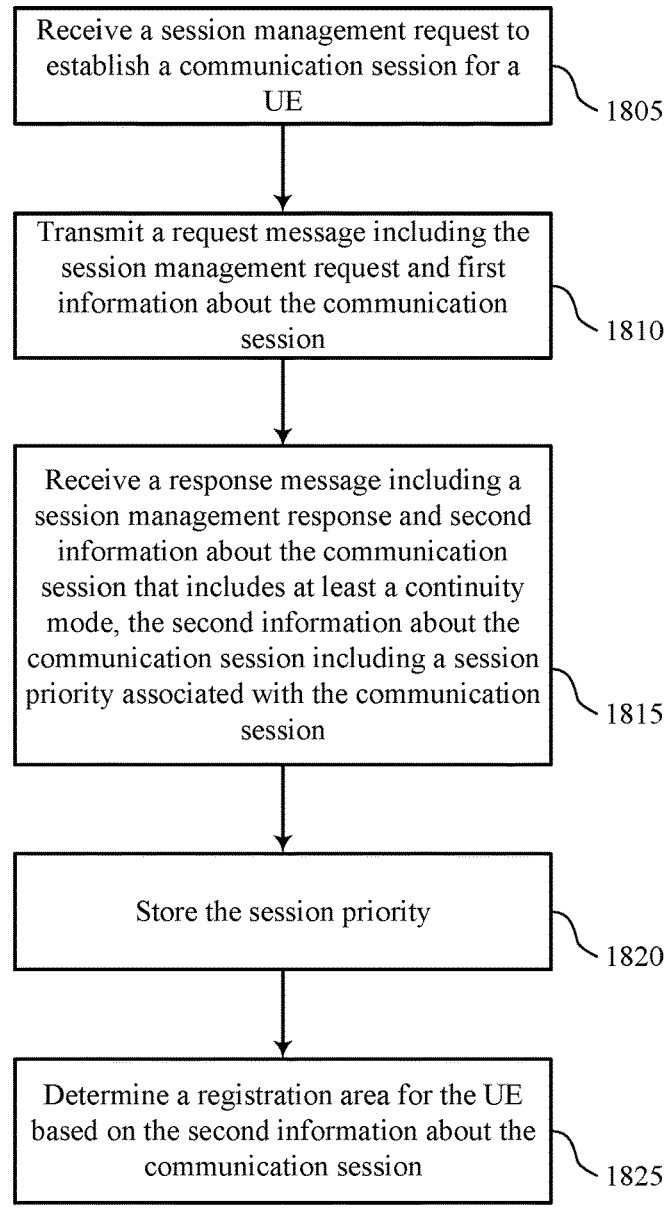

FIG. 18 shows a flowchart illustrating a method 1800 for a mechanism to enable optimized user plane anchoring for minimization of user plane relocation due to UE mobility in accordance with one or more aspects of the present disclosure. The operations of method 1800 may be implemented by an access and mobility manager or its components as described herein. For example, the operations of method 1800 may be performed by an access and mobility manager user plane relocation component as described with reference to FIGS. 9 through 12. In some examples, an access and mobility manager may execute a set of codes to control the functional elements of the device to perform the functions described below. Additionally or alternatively, the access and mobility manager may perform aspects of the functions described below using special-purpose hardware.

At 1805 the access and mobility manager may receive a session management request to establish a communication session for a UE 115. The operations of 1805 may be performed according to the methods described with reference to FIGS. 1 through 3. In certain examples, aspects of the operations of 1805 may be performed by a session management component as described with reference to FIGS. 9 through 12.

At 1810 the access and mobility manager may transmit a request message comprising the session management request and first information about the communication session. The operations of 1810 may be performed according to the methods described with reference to FIGS. 1 through 3. In certain examples, aspects of the operations of 1810 may be performed by an access and mobility manager request component as described with reference to FIGS. 9 through 12.

At 1815 the access and mobility manager may receive a response message comprising a session management response and response communication session information that includes at least a continuity mode, where the response communication session information comprises a session priority associated with the communication session. The operations of 1815 may be performed according to the methods described with reference to FIGS. 1 through 3. In certain examples, aspects of the operations of 1815 may be performed by an access and mobility manager response component as described with reference to FIGS. 9 through 12.

At 1820 the access and mobility manager may store the session priority. The operations of 1820 may be performed according to the methods described with reference to FIGS. 1 through 3. In certain examples, aspects of the operations of 1820 may be performed by an access and mobility manager priority component as described with reference to FIGS. 9 through 12.

At 1825 the access and mobility manager may determine a registration area for the UE 115 based at least in part on the response communication session information. In some examples, determining the registration area may include determining the registration area based at least in part on the session priority. The operations of 1825 may be performed according to the methods described with reference to FIGS. 1 through 3. In certain examples, aspects of the operations of 1825 may be performed by a registration area manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications system architecture 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a connectivity session manager within a network, comprising:
   receiving a request message comprising a session management request for establishing a communication session for a user equipment (UE) and first information about the communication session, wherein the first information comprises UE location information that includes a registration area;
   identifying a continuity mode based at least in part on the received session management request;
   selecting a user plane anchor to serve the communication session for the UE according to the identified continuity mode; and
   transmitting a response message based at least in part on the selected user plane anchor, the response message comprising a session management response and second information about the communication session that includes at least an indication of the identified continuity mode.

2. The method of claim 1, further comprising:
   identifying a second continuity mode for the communication session;
   selecting a second user plane anchor to serve the communication session according to the identified second continuity mode; and
   transmitting a message based at least in part on the selected second user plane anchor.

3. The method of claim 1, further comprising:
   determining a session area code value based at least in part on the selected user plane anchor and the identified continuity mode.

4. The method of claim 3, wherein determining the session area code value comprises:
   determining, using a connectivity session manager session area code table, the session area code value corresponding to the selected user plane anchor and the identified continuity mode.

5. The method of claim 3, wherein the second information about the communication session comprises an indication of the determined session area code.

6. The method of claim 5, wherein the second information about the communication session includes an indication of whether the identified continuity mode should be considered for determining a registration area.

7. The method of claim 1, wherein selecting the user plane anchor comprises:
   determining the user plane anchor based at least in part on a local policy, a UE subscription, the first information about the communication session, or a combination thereof.

8. The method of claim 1, wherein the first information about the communication session comprises UE location information that includes a cell identity (ID), a proposed session area code value, or a combination thereof.

9. The method of claim 8, wherein selecting the user plane anchor comprises:
determining, using a session area code table, the user plane anchor from a set of user plane anchors that correspond to the proposed session area code value and the identified continuity mode.

10. The method of claim 8, wherein selecting the user plane anchor comprises:
discarding the proposed session area code value based at least in part on a local policy, a UE subscription, or both; and
selecting the user plane anchor based on the local policy, the UE subscription, or both and according to the identified continuity mode.

11. The method of claim 1, wherein the session management request comprises a proposed session priority requested by the UE and associated with the communication session, the method further comprising:
transmitting, as part of the second information about the communication session, a selected session priority based at least in part on the proposed session priority.

12. The method of claim 11, further comprising:
receiving a subscribed session priority from unified data management.

13. The method of claim 12, further comprising:
comparing the proposed session priority with the subscribed session priority; and
determining the selected session priority based at least in part on the comparison.

14. The method of claim 1, wherein the continuity mode comprises a session and service continuity (SSC).

15. The method of claim 1, wherein the communication session comprises a protocol data unit (PDU) session.

16. The method of claim 1, wherein the request message is received from an access and mobility manager.

17. The method of claim 1, wherein the response message is transmitted to an access and mobility manager.

18. An apparatus for wireless communication by a connectivity session manager within a network, comprising:
a processor;
memory in electronic communication with the processor; and
the processor and memory configured to:
receive a request message comprising a session management request for establishing a communication session for a user equipment (UE) and first information about the communication session, wherein the first information comprises UE location information that includes a registration area;
identify a continuity mode based at least in part on the received session management request;
select a user plane anchor to serve the communication session for the UE according to the identified continuity mode; and
transmit a response message based at least in part on the selected user plane anchor, the response message comprising a session management response and second information about the communication session that includes at least an indication of the identified continuity mode.

* * * * *